(12) United States Patent
Matsushima

(10) Patent No.: US 11,789,318 B2
(45) Date of Patent: Oct. 17, 2023

(54) DISPLAY DEVICE

(71) Applicant: Japan Display Inc., Tokyo (JP)

(72) Inventor: Toshiharu Matsushima, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 20 days.

(21) Appl. No.: 17/714,179

(22) Filed: Apr. 6, 2022

(65) Prior Publication Data

US 2022/0326574 A1  Oct. 13, 2022

(30) Foreign Application Priority Data

Apr. 7, 2021  (JP) .................................. 2021-065406

(51) Int. Cl.
*G02F 1/13363* (2006.01)
*G02F 1/1335* (2006.01)

(52) U.S. Cl.
CPC .. *G02F 1/133636* (2013.01); *G02F 1/133531* (2021.01)

(58) Field of Classification Search
CPC ......... G02F 1/133636; G02F 1/133531; G02F 1/1347; G02F 1/13471
See application file for complete search history.

(56) References Cited

U.S. PATENT DOCUMENTS

| 10,782,545 B2* | 9/2020 | Smith | G02F 1/134309 |
| 2009/0021657 A1* | 1/2009 | Yang | G02F 1/13471 |
| | | | 349/96 |
| 2020/0326567 A1* | 10/2020 | Fang | G02F 1/133524 |

FOREIGN PATENT DOCUMENTS

| JP | 2004-133334 A | 4/2004 |
| JP | 2006-195388 A | 7/2006 |

* cited by examiner

*Primary Examiner* — Nathanael R Briggs
(74) *Attorney, Agent, or Firm* — XSENSUS LLP

(57) ABSTRACT

According to one embodiment, a display device includes a first viewing angle control panel including a first liquid crystal molecule, a second viewing angle control panel including a second liquid crystal molecule, and a polarization axis rotating element. An initial alignment direction of the first liquid crystal molecule is substantially orthogonal to an initial alignment direction of the second liquid crystal molecule. A second polarization component transmitted through the first viewing angle control panel includes a second polarization axis. A third polarization component transmitted through the second viewing angle control panel includes a third polarization axis. The polarization axis rotating element rotates the third polarization axis to align the third polarization axis with the second polarization axis.

11 Claims, 17 Drawing Sheets

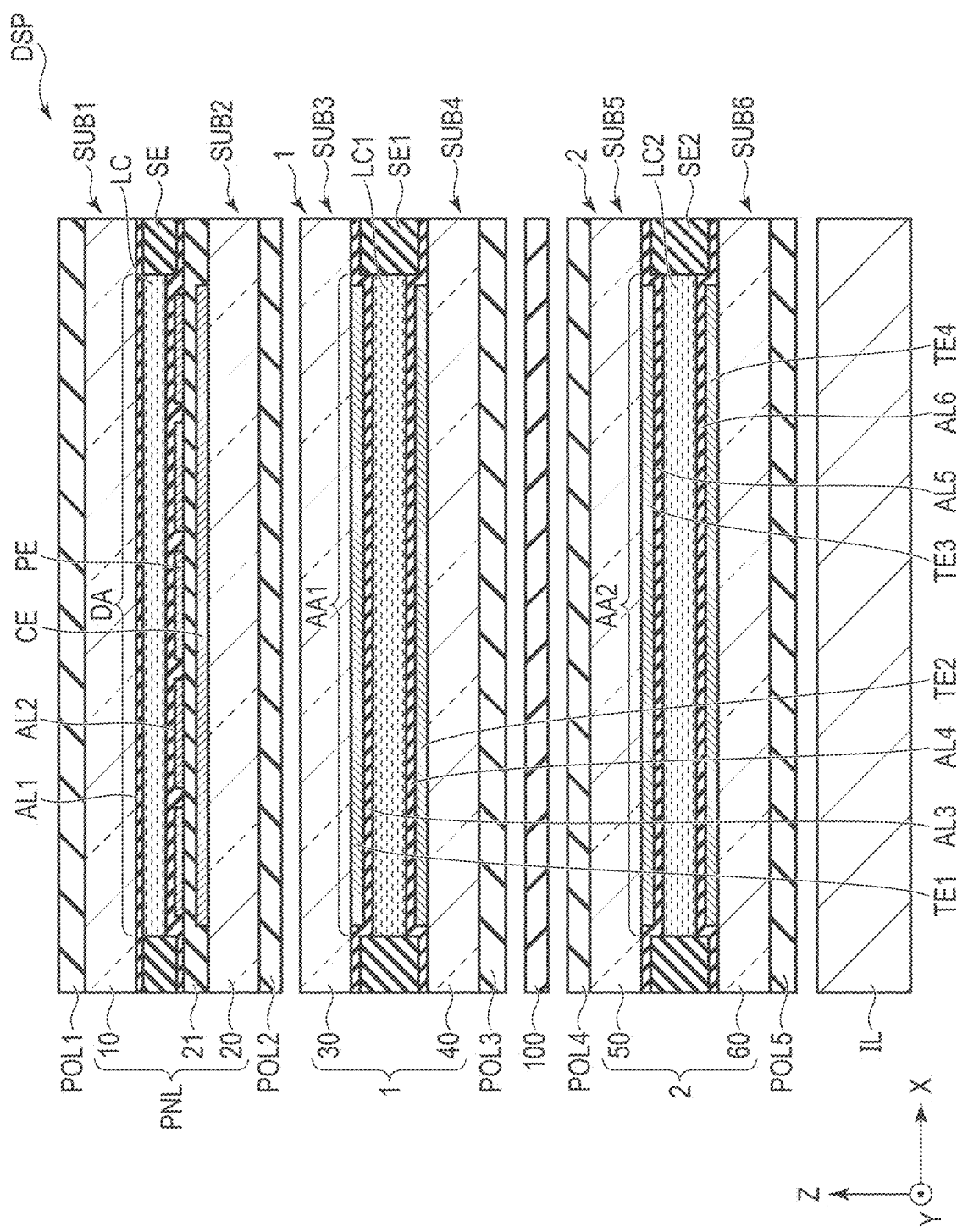
F I G. 2

DISPLAY DEVICE

CROSS-REFERENCE TO RELATED APPLICATIONS

This application is based upon and claims the benefit of priority from Japanese Patent Application No. 2021-065406, filed Apr. 7, 2021, the entire contents of which are incorporated herein by reference.

FIELD

Embodiments described herein relate generally to a display device.

BACKGROUND

In recent display devices, there is a demand for varying a viewing angle at which a predetermined contrast ratio can be obtained. For example, in a display device mounted on a vehicle such as an automobile, it is required to perform viewing angle control so that a display image can be visually recognized from a passenger seat side and the display image cannot be visually recognized from a driver seat side when the driver is driving or the like.

Several techniques using a twisted nematic liquid crystal element have been proposed in such applications for controlling the viewing angle.

BRIEF DESCRIPTION OF THE DRAWINGS

FIG. 2 is a cross-sectional view illustrating a configuration example of the display device DSP illustrated in FIG. 1.

FIG. 11 is a diagram illustrating viewing angle characteristics of the second viewing angle control panel 2 at the time of OFF and ON.

FIG. 13 is a diagram illustrating viewing angle characteristics of the first viewing angle control panel 1 at the time of ON.

DETAILED DESCRIPTION

Figure 1:
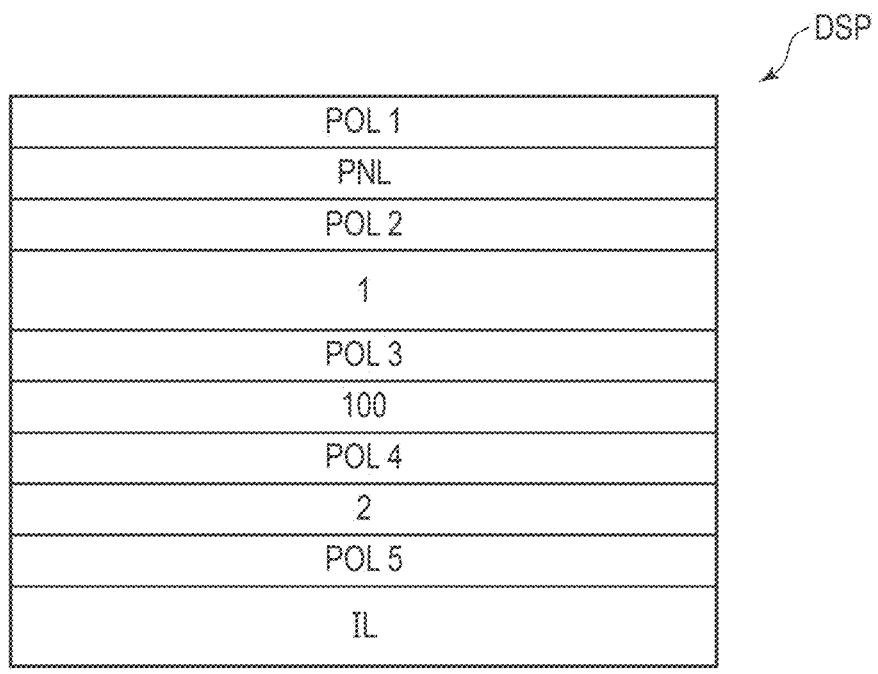
FIG. 1 is a diagram illustrating a configuration example of a display device DSP according to an embodiment.

An object of the embodiment is to provide a display device capable of controlling a viewing angle.

In general, according to one embodiment, a display device includes: a display panel configured to modulate a first polarization component; a first viewing angle control panel including a first liquid crystal layer containing hybrid-aligned liquid crystal molecules; a second viewing angle control panel including a second liquid crystal layer containing twist-aligned liquid crystal molecules; and a polarization axis rotating element provided between the first viewing angle control panel and the second viewing angle control panel. The first viewing angle control panel is provided between the polarization axis rotating element and the display panel. In planar view, an initial alignment direction of a horizontally aligned first liquid crystal molecule among liquid crystal molecules of the first liquid crystal layer is substantially orthogonal to an initial alignment direction of a second liquid crystal molecule located in an intermediate layer among liquid crystal molecules of the second liquid crystal layer, a second polarization axis of a second polarization component transmitted through the first viewing angle control panel is substantially parallel to a first polarization axis of the first polarization component, a third polarization axis of a third polarization component transmitted through the second viewing angle control panel is different from the second polarization axis, and the polarization axis rotating element is configured to rotate the third polarization axis to align the third polarization axis with the second polarization axis.

According to the embodiment, a display device capable of controlling a viewing angle can be provided.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Configuration Example

FIG. 1 is a diagram illustrating a configuration example of a display device DSP according to the present embodiment.

The display device DSP includes a display panel PNL, a first viewing angle control panel 1, a second viewing angle control panel 2, a polarization axis rotating element 100, first to fifth polarizers POL1 to POL5, and an illumination device IL.

The first viewing angle control panel 1 is provided between the display panel PNL and the polarization axis rotating element 100. The second viewing angle control panel 2 is provided between the polarization axis rotating element 100 and the illumination device IL. The polarization axis rotating element 100 is provided between the first viewing angle control panel 1 and the second viewing angle control panel 2.

The first polarizer POL1 is provided on the front surface side (alternatively, the observation position side on which the display device DSP is observed) of the display panel PNL. The second polarizer POL2 is provided between the display panel PNL and the first viewing angle control panel 1. A third polarizer POL3 is provided between the first viewing angle control panel 1 and the polarization axis rotating element 100. A fourth polarizer POL4 is provided between the polarization axis rotating element 100 and the second viewing angle control panel 2. A fifth polarizer POL5 is provided on the back side (alternatively, between the second viewing angle control panel 2 and the illumination device IL) of the second viewing angle control panel 2.

Details of the first viewing angle control panel 1 and the second viewing angle control panel 2 will be described later. Note that the second viewing angle control panel 2 may be provided between the display panel PNL and the polarization axis rotating element 100, and the first viewing angle control panel 1 may be provided between the polarization axis rotating element 100 and the illumination device IL.

As described above, the display device DSP of the present embodiment includes a plurality of types of viewing angle control panels between the display panel PNL and the illumination device IL.

FIG. 2 is a cross-sectional view illustrating a configuration example of the display device DSP illustrated in FIG. 1. The first direction X, the second direction Y, and the third direction Z illustrated here are orthogonal to each other, but may intersect each other at an angle other than 90°. The first direction X and the second direction Y correspond to, for example, a direction parallel to a substrate included in the display device DSP, and the third direction Z corresponds to a thickness direction of the display device DSP.

The display panel PNL is, for example, a liquid crystal panel, and includes a first substrate SUB1, a second substrate SUB2, and a liquid crystal layer LC. The liquid crystal layer LC is held between the first substrate SUB1 and the second substrate SUB2, and is sealed by a sealant SE. As an example, the display panel PNL described here is configured to control the alignment state of the liquid crystal molecules included in the liquid crystal layer LC by the electric field along the main surface of the substrate. Note that the display panel PNL of the present embodiment is not limited to the illustrated example, and may be configured to control the alignment state of the liquid crystal molecules by an electric field along the normal line of the main surface of the substrate. The main surface here corresponds to an X-Y plane defined by the first direction X and the second direction Y.

The first substrate SUB1 is located on the front surface side of the second substrate SUB2. The first substrate SUB1 includes an insulating substrate 10 and an alignment film AL1.

The second substrate SUB2 includes an insulating substrate 20, an insulating film 21, a common electrode CE, a plurality of pixel electrodes PE, and an alignment film AL2. The common electrode CE is provided between the insulating substrate 20 and the insulating film 21. The plurality of pixel electrodes PE are provided between the insulating film 21 and the alignment film AL2. In a display area DA where an image is displayed, the plurality of pixel electrodes PE overlap one common electrode CE via the insulating film 21. The pixel electrode PE and the common electrode CE are controlled so as to apply a voltage to the liquid crystal layer LC. The alignment film AL1 and the alignment film AL2 are in contact with the liquid crystal layer LC. In one example, the alignment film AL1 and the alignment film AL2 are horizontal alignment films having an alignment restriction force substantially parallel to the X-Y plane, but may be vertical alignment films.

Here, only the main part of the display panel PNL is illustrated in a simplified manner, but the first substrate SUB1 further includes a light shielding layer, a color filter layer, an overcoat layer, a spacer, and the like. The second substrate SUB2 includes a plurality of scanning lines, a plurality of signal lines, a switching element electrically connected to each pixel electrode PE, various insulating films, and the like.

The first viewing angle control panel 1 is, for example, a liquid crystal panel, and includes a third substrate SUB3, a fourth substrate SUB4, and a first liquid crystal layer LC1. The first liquid crystal layer LC1 is held between the third substrate SUB3 and the fourth substrate SUB4, and sealed by a sealant SE1. The first liquid crystal layer LC1 contains hybrid-aligned liquid crystal molecules as described later.

The third substrate SUB3 is located on the front surface side of the fourth substrate SUB4. The third substrate SUB3 includes an insulating substrate 30, a first transparent electrode TE1, and an alignment film AL3. The first transparent electrode TE1 is formed over substantially the entire area in an effective area AA1 for controlling the viewing angle, and is provided between the insulating substrate 30 and the alignment film AL3.

The fourth substrate SUB4 includes an insulating substrate 40, a second transparent electrode TE2, and an alignment film AL4. The second transparent electrode TE2 is formed over substantially the entire area in the effective area AA1, and is provided between the insulating substrate 40 and the alignment film AL4. The alignment film AL3 and the alignment film AL4 are in contact with the first liquid crystal layer LC1. One of the alignment film AL3 and the alignment film AL4 is a horizontal alignment film, and the other is a vertical alignment film.

The first transparent electrode TE1 overlaps the second transparent electrode TE2 with the first liquid crystal layer LC1 interposed therebetween. The first transparent electrode TE1 and the second transparent electrode TE2 are controlled to apply a voltage to the first liquid crystal layer LC1.

The second viewing angle control panel 2 is, for example, a liquid crystal panel, and includes a fifth substrate SUB5, a sixth substrate SUB6, and a second liquid crystal layer LC2. The second liquid crystal layer LC2 is held between the fifth substrate SUB5 and the sixth substrate SUB6, and sealed by a sealant SE2. The second liquid crystal layer LC2 contains twist-aligned liquid crystal molecules as described later.

The fifth substrate SUB5 is located on the front surface side of the sixth substrate SUB6. The fifth substrate SUB5 includes an insulating substrate 50, a third transparent electrode TE3, and an alignment film AL5. The third transparent electrode TE3 is formed over substantially the entire area in an effective area AA2 for controlling the viewing angle, and is provided between the insulating substrate 50 and the alignment film AL5.

The sixth substrate SUB6 includes an insulating substrate 60, a fourth transparent electrode TE4, and an alignment film AL6. The fourth transparent electrode TE4 is formed over substantially the entire area in the effective area AA2, and is provided between the insulating substrate 60 and the alignment film AL6. The alignment film AL5 and the alignment film AL6 are in contact with the second liquid crystal layer LC2. The alignment film AL5 and the alignment film AL6 are horizontal alignment films. As described later, the second liquid crystal layer LC2 has optical rotary power to rotate a polarization axis of a polarization component that is linearly polarized light.

The third transparent electrode TE3 overlaps the fourth transparent electrode TE4 with the second liquid crystal layer LC2 interposed therebetween. The third transparent electrode TE3 and the fourth transparent electrode TE4 are controlled to apply a voltage to the second liquid crystal layer LC2.

Each of the first transparent electrode TE1, the second transparent electrode TE2, the third transparent electrode TE3, and the fourth transparent electrode TE4 is, for example, a single sheet electrode, but may be an electrode divided into a plurality of portions along at least one of the first direction X and the second direction Y.

Here, attention is paid to the relationship among the display panel PNL, the first viewing angle control panel 1, and the second viewing angle control panel 2.

The liquid crystal layer LC, the first liquid crystal layer LC1, and the second liquid crystal layer LC2 overlap each other in the third direction Z. The display area DA, the effective area AA1, and the effective area AA2 overlap each other in the third direction Z. The common electrode CE, the plurality of pixel electrodes PE, the first transparent electrode TE1, the second transparent electrode TE2, the third transparent electrode TE3, and the fourth transparent electrode TE4 overlap each other in the third direction Z.

The insulating substrates 10, 20, 30, 40, 50, and 60 are transparent substrates such as glass substrates and resin substrates. For example, the insulating substrates 10 and 20 may be glass substrates, and the insulating substrates 30 and 40 may be resin substrates. Further, the insulating substrates 10 and 40 may be glass substrates, and the insulating substrates 20 and 30 may be resin substrates.

The common electrode CE, the pixel electrode PE, the first transparent electrode TE1, the second transparent electrode TE2, the third transparent electrode TE3, and the fourth transparent electrode TE4 are transparent electrodes formed of a transparent conductive material such as indium tin oxide (ITO) or indium zinc oxide (IZO).

The first polarizer POL1 is bonded to the insulating substrate 10, the second polarizer POL2 is bonded to at least one of the insulating substrate 20 and the insulating substrate 30, the third polarizer POL3 is bonded to the insulating substrate 40, the fourth polarizer POL4 is bonded to the insulating substrate 50, and the fifth polarizer POL5 is bonded to the insulating substrate 60. These first to fifth polarizers POL1 to POL5 have an adhesive on one surface of a film formed in advance, but may be formed directly on the surface of an insulating substrate.

The polarization axis rotating element 100 may be bonded to at least one of the third polarizer POL3 and the fourth polarizer POL4, or may be integrally formed with the third polarizer POL3 or the fourth polarizer POL4.

In such a display device DSP, the illumination light (unpolarized light) emitted from the illumination device IL travels along the third direction Z, sequentially transmits through the second viewing angle control panel 2, the polarization axis rotating element 100, and the first viewing angle control panel 1, and then illuminates the display panel PNL.

More specifically, when the illumination light emitted from the illumination device IL is unpolarized light, the fifth polarizer POL5 transmits a part of polarization component of the illumination light.

The second viewing angle control panel 2 rotates the polarization axis of the polarization component transmitted through the fifth polarizer POL5 in the second liquid crystal layer LC2. The fourth polarizer POL4 transmits the polarization component transmitted through the second viewing angle control panel 2.

The polarization axis rotating element 100 transmits the polarization component transmitted through the fourth polarizer POL4. The third polarizer POL3 transmits the polarization component transmitted through the polarization axis rotating element 100.

The first viewing angle control panel 1 modulates and transmits the polarization component transmitted through the third polarizer POL3 in the first liquid crystal layer LC1. The second polarizer POL2 transmits the polarization component transmitted through the first viewing angle control panel 1.

The display panel PNL is illuminated by the polarization component transmitted through the second polarizer POL2, and modulates the polarization component in the liquid crystal layer LC. The first polarizer POL1 transmits at least a part of the polarization component transmitted through the display panel PNL.

Here, when the polarization component modulated by the display panel PNL is a first polarization component and the polarization component transmitted through the first viewing angle control panel 1 is a second polarization component, a second polarization axis of the second polarization component is substantially parallel to a first polarization axis of the first polarization component.

When the polarization component transmitted through the second viewing angle control panel 2 is a third polarization component, a third polarization axis of the third polarization component is different from the second polarization axis.

For example, each of the first polarization component, the second polarization component, and the third polarization component is linearly polarized light having a polarization axis on the X-Y plane. In the X-Y plane, when the first direction X is set as a reference azimuth, the first polarization component has a first polarization axis in an azimuth forming a predetermined angle with respect to the first direction X, the second polarization component has a second polarization axis substantially parallel to the first polarization axis with respect to the first direction X, and the third polarization component has a third polarization axis in an azimuth different from the second polarization axis with respect to the first direction X.

The polarization axis rotating element 100 rotates a polarization axis of light directed from the second viewing angle control panel 2 toward the first viewing angle control panel 1. For example, the polarization axis rotating element 100 is an optical sheet (retardation plate) configured to impart a ½ wavelength retardation to the linearly polarized light transmitted therethrough. Such a polarization axis rotating element 100 may be a single optical sheet or a multilayer optical sheet. In addition, the polarization axis rotating element 100 is not limited to the optical sheet as long as it can exhibit a function of rotating the polarization axis, and may be an element having optical rotary power such as a twisted nematic liquid crystal element.

In such a polarization axis rotating element 100, the third polarization axis of the third polarization component transmitted through the second viewing angle control panel 2 and the fourth polarizer POL4 rotates so as to be aligned with the second polarization axis. Therefore, absorption of the illumination light transmitted through the second viewing angle control panel 2 by the third polarizer POL3 is suppressed, and a decrease in luminance of the illumination light reaching the display panel PNL can be suppressed.

Figure 3:
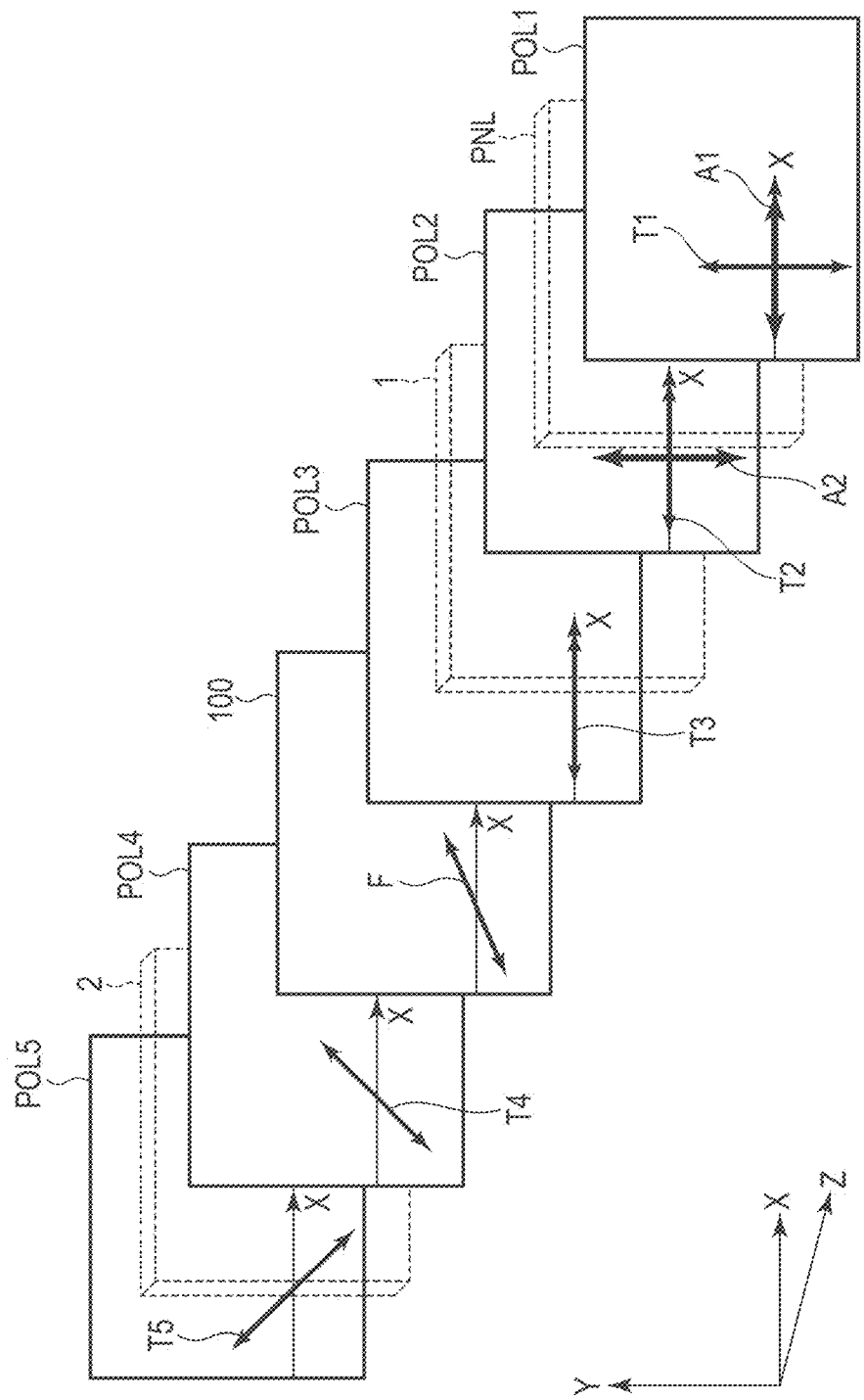
FIG. 3 is a diagram for explaining an axial angle of each optical element constituting the display device DSP illustrated in FIG. 1.

FIG. 3 is a diagram for explaining an axial angle of each optical element constituting the display device DSP illustrated in FIG. 1. Here, in the X-Y plane, an azimuth of a tip end of an arrow indicating the first direction X (X axis) is set as a reference azimuth, and a counterclockwise angle with respect to the reference azimuth is set as a positive angle.

The first polarizer POL1 has a first absorption axis A1 and a first transmission axis T1 that are substantially orthogonal to each other. The second polarizer POL2 has a second absorption axis A2 and a second transmission axis T2 that are substantially orthogonal to each other. The polarization axis rotating element 100 has a fast axis F. The third polarizer POL3 has a third transmission axis T3. The fourth polarizer POL4 has a fourth transmission axis T4. The fifth polarizer POL5 has a fifth transmission axis T5.

Although not illustrated, a slow axis of the polarization axis rotating element 100 is substantially orthogonal to the fast axis F in the X-Y plane. The absorption axis of the third polarizer POL3 is substantially orthogonal to the third transmission axis T3, the absorption axis of the fourth polarizer POL4 is substantially orthogonal to the fourth transmission axis T4, and the absorption axis of the fifth polarizer POL5 is substantially orthogonal to the fifth transmission axis T5.

The transmission axes of the first polarizer POL1 and the second polarizer POL2 sandwiching the display panel PNL are orthogonal to each other. For example, the first absorption axis A1 is substantially parallel to the first direction X and is located in an azimuth of 0°. The first transmission axis T1 is located in an azimuth of 90°. The second absorption axis A2 is substantially orthogonal to the first absorption axis A1 and is located in an azimuth of 90°. The second transmission axis T2 is substantially orthogonal to the first transmission axis T1 and is located in an azimuth of 0°.

The transmission axes of the second polarizer POL2 and the third polarizer POL3 sandwiching the first viewing angle control panel 1 are parallel to each other. That is, the third transmission axis T3 is located in an azimuth of 0°.

The transmission axes of the fourth polarizer POL4 and the fifth polarizer POL5 sandwiching the second viewing angle control panel 2 are orthogonal to each other. The fourth transmission axis T4 is located in an azimuth different from the third transmission axis and located in an azimuth of 45°. The fifth transmission axis T5 is substantially orthogonal to the fourth transmission axis T4 and is located in an azimuth of 135°.

Here, the azimuth of 0° corresponds to an azimuth over 0°-180° in the X-Y plane, the azimuth of 90° corresponds to an azimuth over 90°-270°, the azimuth of 45° corresponds to an azimuth over 45°-225° in the X-Y plane, and the azimuth of 135° corresponds to an azimuth over 135°-315° in the X-Y plane.

In such a display device DSP, when light travels along the third direction Z, linearly polarized light transmitted through the fifth polarizer POL5 has a polarization axis along the fifth transmission axis T5, and linearly polarized light (third polarization component) transmitted through the second viewing angle control panel 2 and through the fourth polarizer POL4 has a third polarization axis along the fourth transmission axis T4. That is, the third polarization axis is located in an azimuth (alternatively, an azimuth of 45°-225°) of 45° with respect to the X axis.

The linearly polarized light (second polarization component) transmitted through the first viewing angle control panel 1 after transmitted through the third polarizer POL3 has a second polarization axis along the third transmission axis T3. That is, the second polarization axis is located in an azimuth of 0° (alternatively, an azimuth of 0°-180° or the X-axis direction).

The fast axis F or the slow axis of the polarization axis rotating element 100 is located in an intermediate azimuth between the azimuth of the second polarization axis and the azimuth of the third polarization axis in the X-Y plane. Alternatively, the fast axis F or the slow axis is located in an intermediate azimuth between the azimuth of the third transmission axis T3 and the azimuth of the fourth transmission axis T4. That is, in the illustrated example, the fast axis F or the slow axis is located in an azimuth of 22.5° (alternatively, an azimuth of 22.5°-202.5°).

When the third transmission axis T3 is located in the azimuth of 90° and the fourth transmission axis T4 is located in the azimuth of 45°, the polarization axis rotating element 100 is disposed so that the fast axis F or the slow axis is located in an azimuth of 67.5° (alternatively, an azimuth of 67.5°-247.5°).

As described above, since the polarization axis rotating element 100 corresponds to the ½ wavelength plate, it has a function of rotating the polarization axis by 2*θ° when the polarization axis of the incident light is located in an azimuth of θ° with respect to the fast axis. Therefore, when the third polarization component transmitted through the fourth polarizer POL4 is transmitted through the polarization axis rotating element 100, the third polarization axis is rotated so as to be aligned with the second polarization axis. That is, the third polarization component is converted into the second polarization component in the polarization axis rotating element 100. The second polarization component transmitted through the polarization axis rotating element 100 is hardly absorbed by the third polarizer POL3, and illuminates the display panel PNL through the first viewing angle control panel 1.

The first polarization component illuminating the display panel PNL is appropriately modulated in the liquid crystal layer LC, and at least a part of the first polarization component is transmitted through the first polarizer POL1 to form a display image. The linearly polarized light transmitted through the first polarizer POL1 has a polarization axis along the first transmission axis T1. That is, the polarization axis of the linearly polarized light transmitted through the first polarizer POL1 is located in an azimuth of 90° (alternatively, an azimuth of 90°-270°). Therefore, even when the display device DSP is observed through polarization sunglasses, the display image can be visually recognized.

Next, the first viewing angle control panel 1 will be described.

Figure 4:
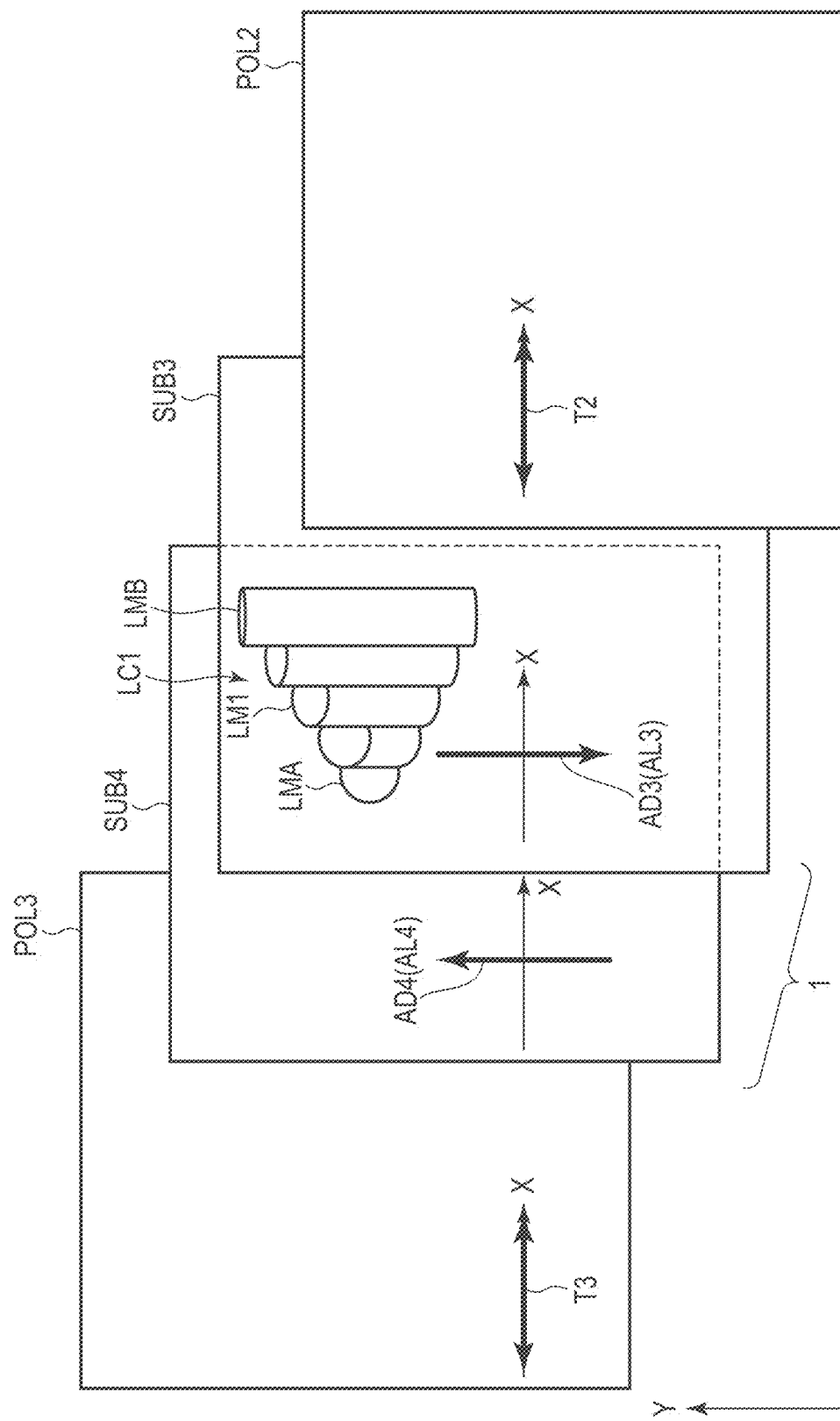
FIG. 4 is a diagram for explaining a configuration example of a first viewing angle control panel 1.

FIG. 4 is a diagram for explaining a configuration example of the first viewing angle control panel 1. Here, the initial alignment state of the liquid crystal molecules LM1 at the time of OFF when no voltage is applied to the first liquid crystal layer LC1 between the alignment film AL3 and the alignment film AL4 is shown. In the example shown here, a case where the alignment film AL4 is a vertical alignment film and the alignment film AL3 is a horizontal alignment film will be described. In this regard, as described above, the alignment film AL3 may be a vertical alignment film, and the alignment film AL4 may be a horizontal alignment film.

Alignment treatment is required for the alignment film AL3 which is a horizontal alignment film, and alignment treatment is not required for the alignment film AL4 which is a vertical alignment film. However, from the viewpoint of obtaining a stable alignment state, it is desirable to perform the alignment treatment on the alignment film AL4. In this case, an alignment treatment direction AD4 of the alignment film AL4 is substantially parallel to an alignment treatment direction AD3 of the alignment film AL3 and in the opposite direction. The alignment treatment may be rubbing treatment or photo-alignment treatment.

In the configuration example shown in FIG. 4, the alignment treatment direction AD3 and the alignment treatment direction AD4 are located in an azimuth of 90°-270°. The alignment treatment direction AD4 is substantially orthogonal to the third transmission axis T3, and the alignment treatment direction AD3 is substantially orthogonal to the second transmission axis T2. The second transmission axis T2 and the third transmission axis T3 may be located in an azimuth of 0°-180°. In this case, the second transmission axis T2 and the third transmission axis T3 are parallel to the alignment treatment direction AD3 and the alignment treatment direction AD4.

In the first liquid crystal layer LC1, the liquid crystal molecules LM1 aligned along the third direction Z are hybrid aligned. FIG. 4 schematically illustrates a plurality of liquid crystal molecules LM1 in planar view. A liquid crystal molecule LMA on a side close to the third polarizer POL3 and the fourth substrate SUB4 is vertically aligned so that its major axis is along the normal line (third direction) of the substrate.

A liquid crystal molecule (first liquid crystal molecule) LMB on a side close to the second polarizer POL2 and the third substrate SUB3 is horizontally aligned along the X-Y plane, and its major axis is aligned along the alignment treatment direction AD3. Alternatively, the liquid crystal molecule LMB is aligned in an azimuth orthogonal to the second transmission axis T2 and the third transmission axis T3. That is, the liquid crystal molecule LMB is aligned in an azimuth of 90°-270°. In addition, the liquid crystal molecule LMB is inclined so that the end portion on a tip end side of an arrow indicating the alignment treatment direction AD3 is separated from the third substrate SUB3 (alternatively, the end portion on a rear end side of the arrow indicating the alignment treatment direction AD3 is inclined so as to approach the third substrate SUB3).

Note that the arrow indicating the alignment treatment direction AD3 and the arrow indicating the alignment treatment direction AD4 may be in opposite directions. The liquid crystal molecule LMA may be aligned in an azimuth of 90°-270°, and the liquid crystal molecule LMB may be vertically aligned.

Figure 5:
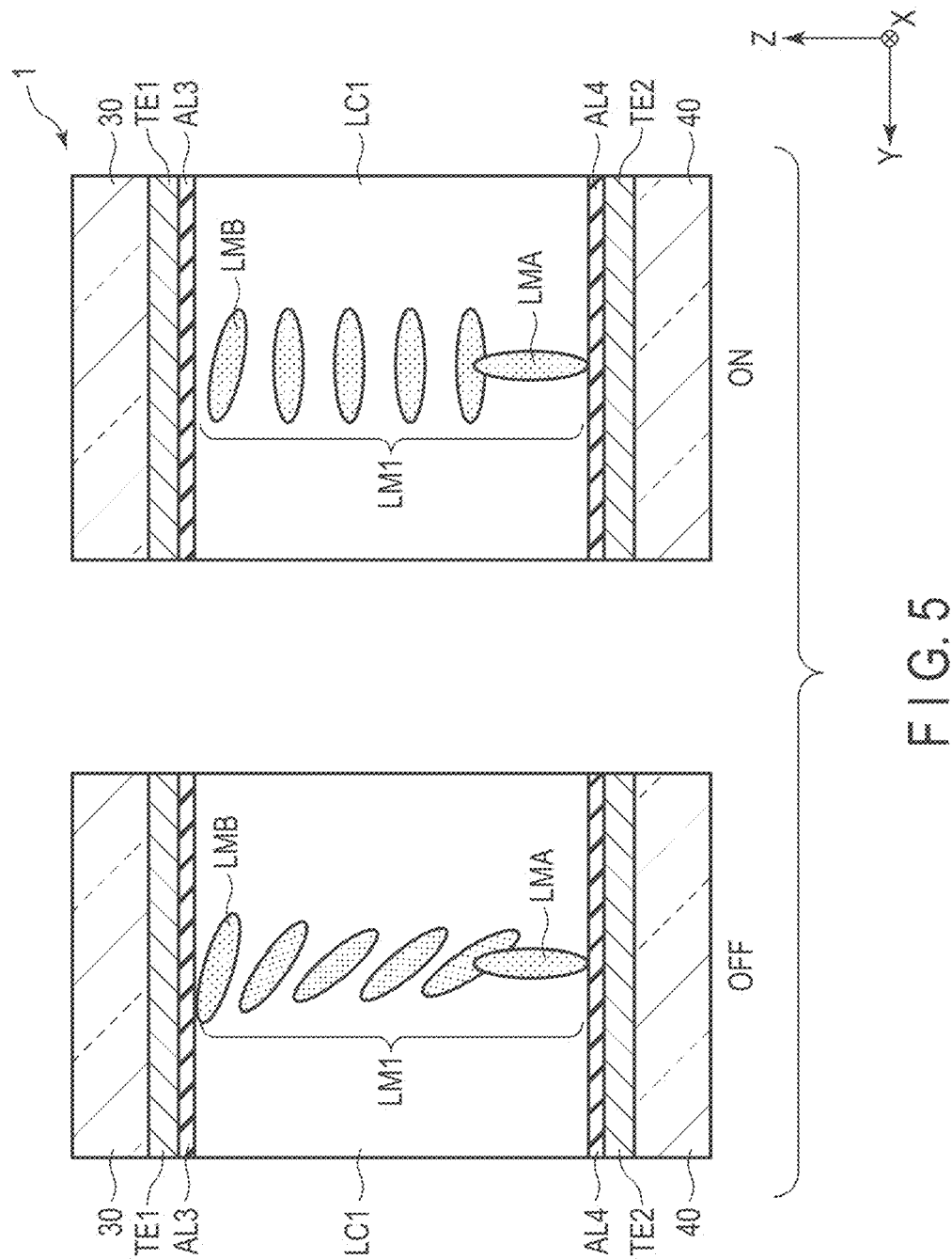
FIG. 5 is a diagram for explaining an operation of the first viewing angle control panel 1.

FIG. 5 is a diagram for explaining the operation of the first viewing angle control panel 1. The cross-sectional view illustrated on the left side of the drawing illustrates an OFF state (OFF) in which no potential difference is generated between the first transparent electrode TE1 and the second transparent electrode TE2, and the cross-sectional view illustrated on the right side of the drawing illustrates an ON state (ON) in which a potential difference is generated between the first transparent electrode TE1 and the second transparent electrode TE2.

The first liquid crystal layer LC1 is formed of a liquid crystal material (negative liquid crystal material) having negative dielectric anisotropy. The plurality of liquid crystal molecules LM1 arranged along the third direction Z contain liquid crystal molecules LMA and LMB. In the OFF state, the liquid crystal molecule LMA near the alignment film AL4 exhibits substantially vertical alignment, and the liquid crystal molecule LMB near the alignment film AL3 exhibits substantially horizontal alignment. A tilt angle of each of the liquid crystal molecules LM1 between the liquid crystal molecule LMA and liquid crystal molecule LMB continuously changes. As described above, the liquid crystal molecules LM1 are initially aligned so as to exhibit hybrid alignment.

In the ON state, for the negative liquid crystal material, the major axes of the liquid crystal molecules LM1 are aligned so as to cross the electric field. That is, the liquid crystal molecules LM1 are horizontally aligned.

Here, as the first viewing angle control panel 1, a case where the first liquid crystal layer LC1 is formed of a negative liquid crystal material has been described, but the first liquid crystal layer LC1 may be formed of a positive liquid crystal material having positive dielectric anisotropy. The first viewing angle control panel 1 may be a liquid crystal panel to which an electrically controlled birefringence mode is applied. Also in this case, the alignment treatment direction AD4 of the alignment film AL4 and the alignment treatment direction AD3 of the alignment film AL3 are set so as to be parallel to each other and opposite to each other and located in an azimuth of 90°-270°.

Next, the second viewing angle control panel 2 will be described.

Figure 6:
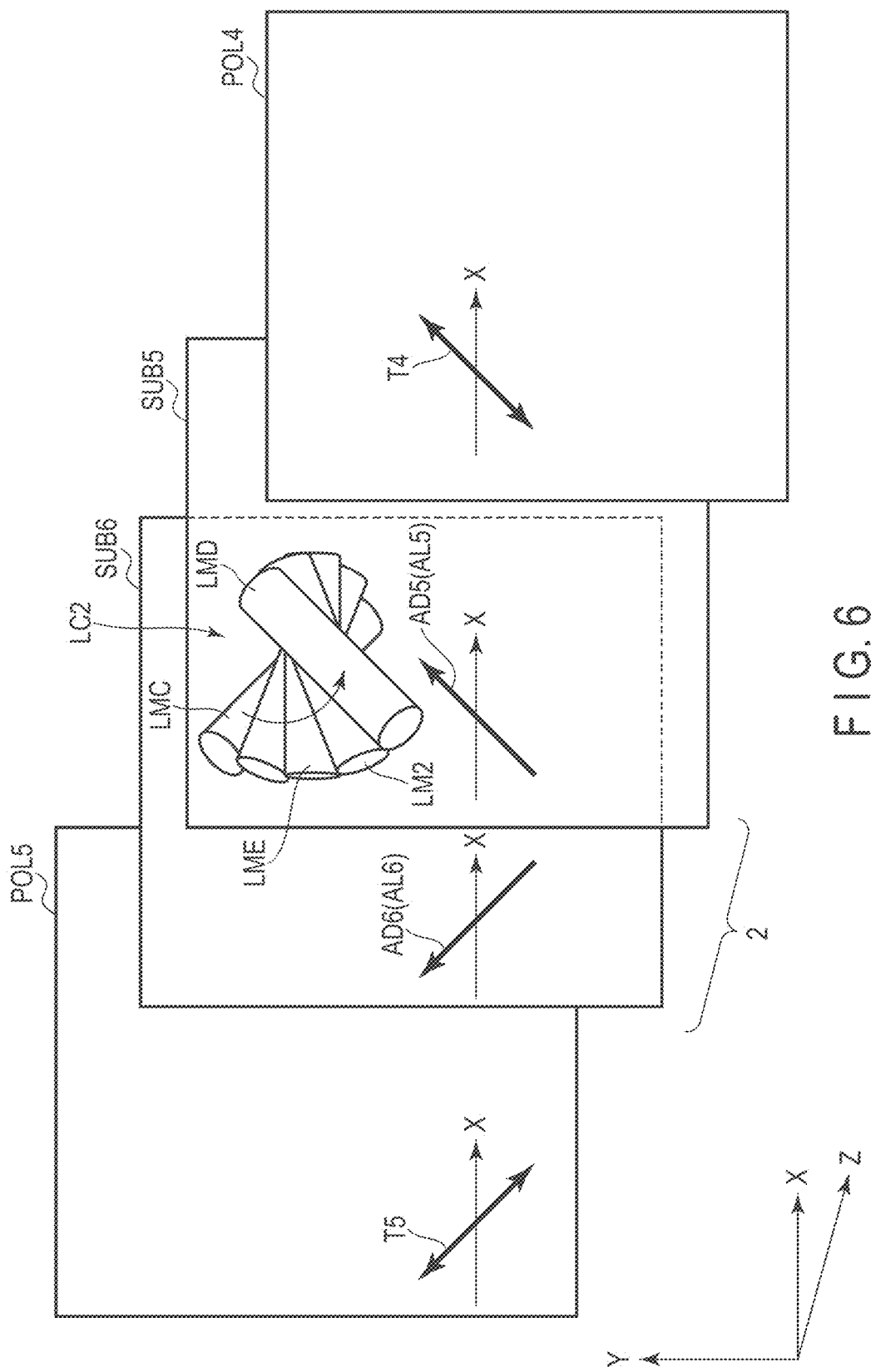
FIG. 6 is a diagram for explaining a configuration example of a second viewing angle control panel 2.

FIG. 6 is a diagram for explaining a configuration example of the second viewing angle control panel 2. Here, the initial alignment state of the liquid crystal molecules LM2 at the time of OFF when no voltage is applied to the second liquid crystal layer LC2 between the alignment film AL5 and the alignment film AL6 is shown.

An alignment treatment direction AD6 of the alignment film AL6 is substantially orthogonal to an alignment treatment direction AD5 of the alignment film AL5. In the configuration example shown in FIG. 6, the alignment treatment direction AD6 is substantially parallel to the fifth transmission axis T5, and the alignment treatment direction AD5 is substantially parallel to the fourth transmission axis T4. That is, the alignment treatment direction AD6 is located in an azimuth of 135°, and the alignment treatment direction AD5 is located in an azimuth of 45°.

In the second liquid crystal layer LC2, liquid crystal molecules LM2 aligned along the third direction Z are twist-aligned. FIG. 6 schematically illustrates a plurality of liquid crystal molecules LM2 in planar view. A chiral agent is added to the second liquid crystal layer LC2, and the liquid crystal molecules LM2 are configured to be twist-aligned counterclockwise from the fifth polarizer POL5 (or sixth substrate SUB6) toward the fourth polarizer POL4 (or fifth substrate SUB5).

A liquid crystal molecule LMC on a side close to the fifth polarizer POL5 and the sixth substrate SUB6 is aligned so that its major axis is along the alignment treatment direction AD6. Alternatively, the liquid crystal molecule LMC is aligned in an azimuth along the fifth transmission axis T5. That is, the liquid crystal molecule LMC is aligned in an azimuth of 135°. In addition, the liquid crystal molecule LMC is inclined (pre-tilted) so that an end portion on a tip end side of an arrow indicating the alignment treatment direction AD6 is separated from the sixth substrate SUB6.

A liquid crystal molecule LMD on a side close to the fourth polarizer POL4 and the fifth substrate SUB5 is aligned so that its major axis is along the alignment treatment direction AD5. Alternatively, the liquid crystal molecule LMD is aligned in an azimuth along the fourth transmission axis T4. That is, the liquid crystal molecule LMD is aligned in an azimuth of 45°. In addition, the liquid crystal molecule LMD is inclined so that an end portion on a tip end side of an arrow indicating the alignment treatment direction AD5 is separated from the fifth substrate SUB5 (alternatively, an end portion on a rear end side of the arrow indicating the alignment treatment direction AD5 is inclined so as to approach the fifth substrate SUB5).

A liquid crystal molecule (second liquid crystal molecule) LME at substantially the center (intermediate layer) of the second liquid crystal layer LC2 in the third direction (thickness direction) Z is aligned so that its major axis is along the first direction X. The alignment direction of such a liquid crystal molecule LME and the alignment direction of the liquid crystal molecule LMB shown in FIG. 4 and the like are substantially orthogonal to each other in the X-Y plane.

The major axis of the liquid crystal molecule LME is substantially parallel to the first absorption axis A1 of the first polarizer POL1 illustrated in FIG. 3 in the X-Y plane.

At least one of the arrow indicating the alignment treatment direction AD5 and the arrow indicating the alignment treatment direction AD6 may be reversed. Further, the alignment treatment direction AD6 and the fifth transmission axis T5 may be located in an azimuth of 45°, and the alignment treatment direction AD5 and the fourth transmission axis T4 may be located in an azimuth of 135°. When the liquid crystal molecule LME is aligned along the first direction X, the liquid crystal molecules LM2 aligned in the third direction Z may be twist-aligned clockwise.

Next, the display panel PNL will be described.

Figure 7:
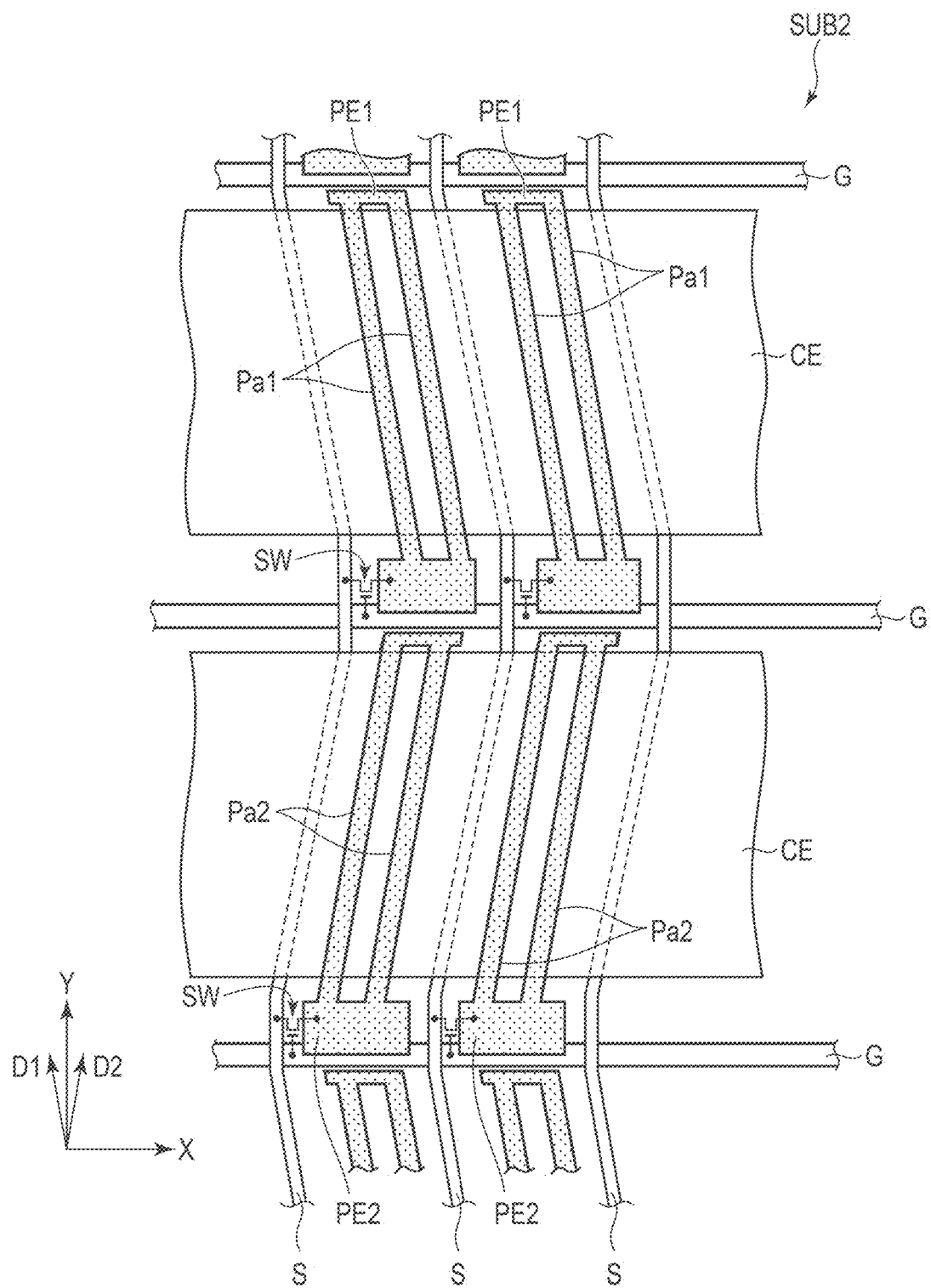
FIG. 7 is a planar view illustrating an example of a pixel layout in a display panel PNL.

FIG. 7 is a planar view illustrating an example of a pixel layout in the display panel PNL. Here, only configurations necessary for description are illustrated. The second substrate SUB2 includes a plurality of scanning lines G, a plurality of signal lines S, a plurality of switching elements SW, and a plurality of pixel electrodes PE1 and PE2.

The plurality of scanning lines G linearly extend along the first direction X and are arranged at intervals in the second direction Y. Each of the plurality of signal lines S extends substantially along the second direction Y and is arranged at intervals in the first direction X. The switching element SW is electrically connected to any of the scanning lines G and any of the signal lines S. Each of the pixel electrodes PE1 and PE2 is electrically connected to any of the switching elements SW.

The plurality of pixel electrodes PE1 are arranged along the first direction X. The pixel electrode PE1 has a strip electrode Pa1 superimposed on the common electrode CE. The strip electrode Pa1 extends along a direction D1 different from the first direction X and the second direction Y.

The plurality of pixel electrodes PE2 are arranged along the first direction X. The pixel electrode PE2 has a strip electrode Pa2 superimposed on the common electrode CE. The strip electrode Pa2 extends along a direction D2 different from the direction D1. The number of the strip electrodes Pa1 and Pa2 may be one or three or more.

Figure 8:
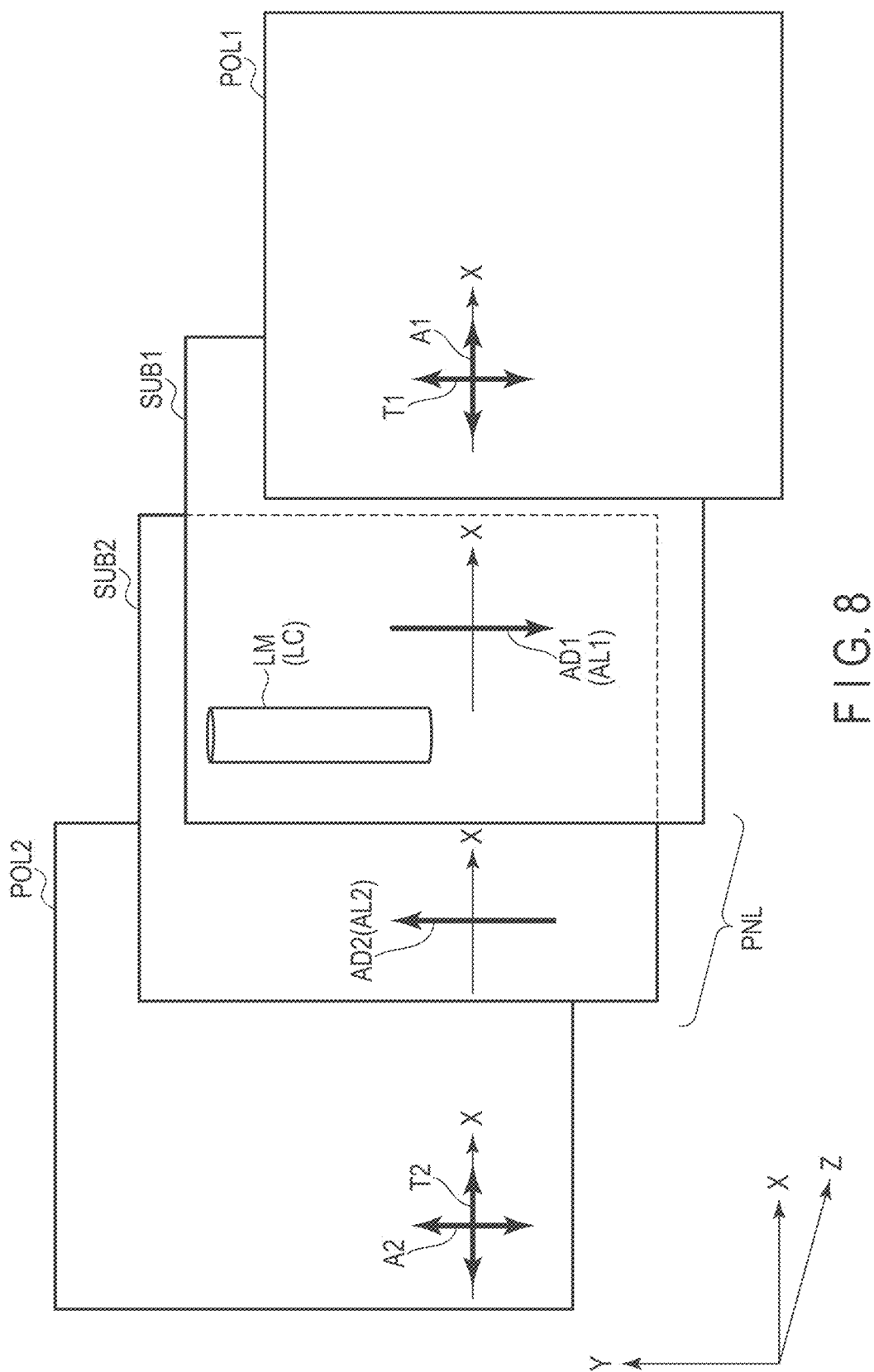
FIG. 8 is a diagram for explaining a configuration example of the display panel PNL.

FIG. 8 is a diagram for explaining a configuration example of the display panel PNL. Here, the initial alignment state of the liquid crystal molecule LM at the time of OFF when no voltage is applied to the liquid crystal layer LC between the alignment film AL1 and the alignment film AL2 is shown.

The alignment treatment direction AD1 of the alignment film AL1 and the alignment treatment direction AD2 of the alignment film AL2 are substantially parallel and opposite to each other. The alignment treatment direction AD1 and the alignment treatment direction AD2 are, for example, substantially parallel to the first transmission axis T1. That is, in the X-Y plane, a tip end of an arrow indicating the alignment treatment direction AD2 is located in an azimuth of 90°, and a tip end of an arrow indicating the alignment treatment direction AD1 is located in an azimuth of 270°. In the liquid crystal layer LC, the liquid crystal molecules LM aligned along the third direction Z are homogeneous-aligned. The liquid crystal molecule LM is aligned so that its major axis is along the second direction Y.

The alignment treatment direction AD1 and the alignment treatment direction AD2 may be substantially orthogonal to the first transmission axis T1. In addition, the second transmission axis T2 may be located in an azimuth of 90°, and the first transmission axis T1 may be located in an azimuth of 0°. However, as described above, from the viewpoint of visually recognizing the display image through the polarization sunglasses, it is desirable that the first transmission axis T1 be located in an azimuth of 90°, and the second transmission axis T2 be located in an azimuth of 0°, as illustrated in the drawing.

Next, viewing angle characteristics of the second viewing angle control panel 2 will be described.

Figure 9:
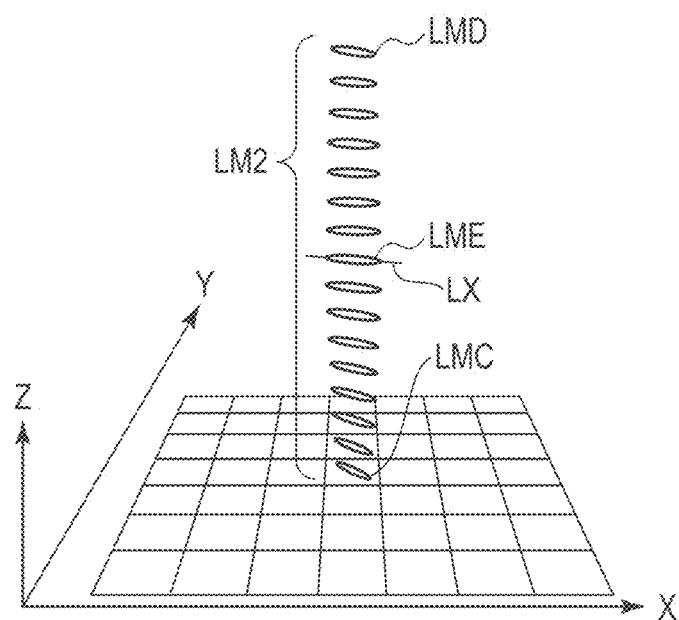
FIG. 9 is a view illustrating an alignment state of liquid crystal molecules LM2 at a time of OFF when no voltage is applied to a second liquid crystal layer LC2.

FIG. 9 is a view illustrating an alignment state of the liquid crystal molecules LM2 when no voltage is applied to the second liquid crystal layer LC2 at the time of OFF. A major axis LX of the liquid crystal molecule LME is substantially parallel to the first direction X and substantially parallel to the X-Y plane. As described with reference to FIG. 6 and the like, when the fourth polarizer POL4 and the fifth polarizer POL5 sandwiching the second viewing angle control panel 2 are arranged in a crossed Nicols relationship, the maximum transmittance is obtained at the time of OFF.

Figure 10:
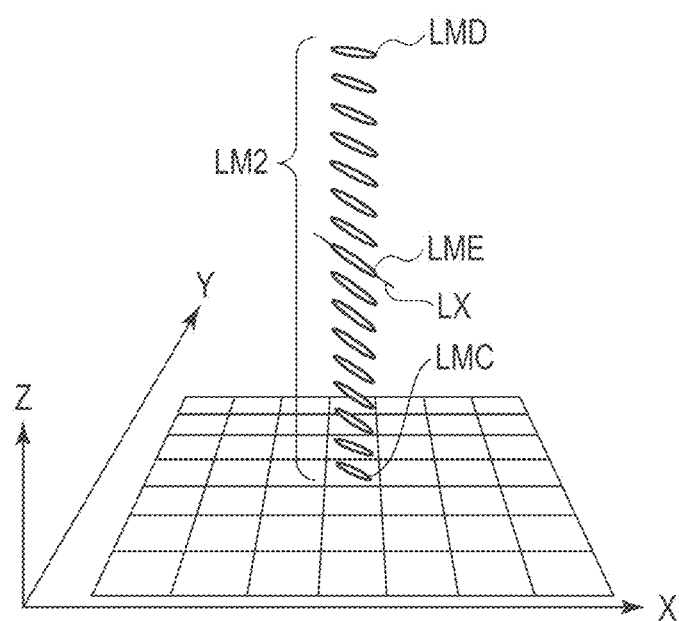
FIG. 10 is a view illustrating an alignment state of the liquid crystal molecules LM2 at a time of ON when a voltage is applied to the second liquid crystal layer LC2.

FIG. 10 is a view illustrating an alignment state of the liquid crystal molecules LM2 at the time of ON when a voltage is applied to the second liquid crystal layer LC2. As the voltage applied to the second liquid crystal layer LC2 increases, the transmittance decreases. Assuming that the voltage applied to the second liquid crystal layer LC2 when the minimum transmittance is obtained is the maximum voltage, FIG. 10 illustrates the alignment state when the voltage of about ½ of the maximum voltage is applied to the second liquid crystal layer LC2. At this time, the major axis LX of the liquid crystal molecule LME is substantially parallel to the first direction X and inclined with respect to the X-Y plane.

In such a second viewing angle control panel 2 at the time of ON, the transmittance is asymmetric between the case where the observation position is inclined to the right side in the drawing (on a tip end side of the arrow indicating the first direction X) with respect to the normal direction (the third direction Z) of the display device and the case where the observation position is inclined to the left side in the drawing (on a rear end side of the arrow indicating the first direction X) with respect to the normal direction.

Figure 11:
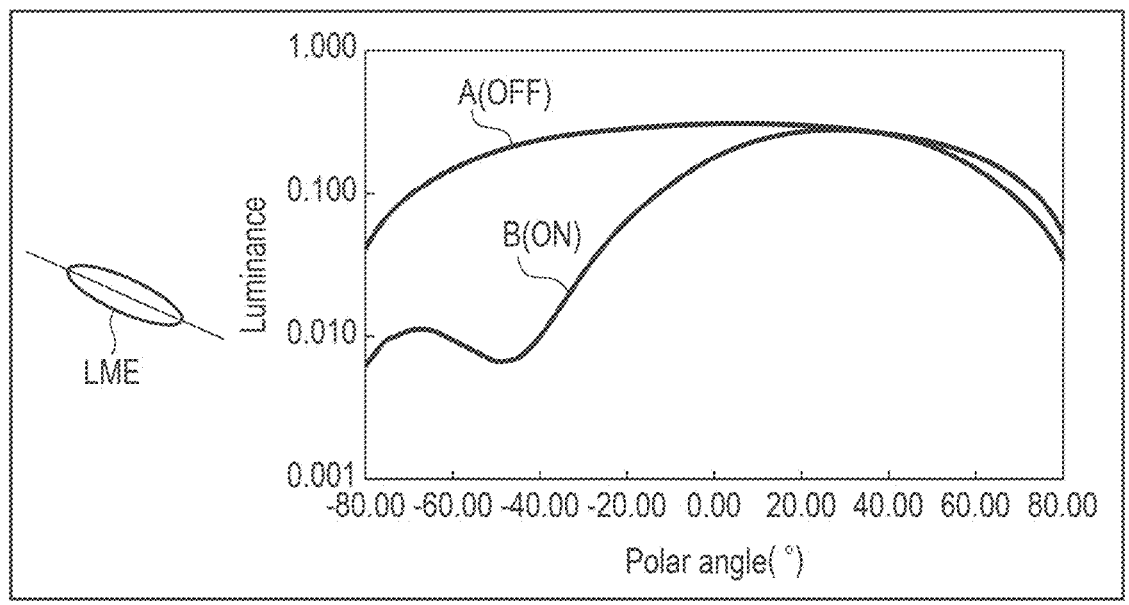

FIG. 11 is a diagram illustrating viewing angle characteristics of the second viewing angle control panel 2 at the time of OFF and ON. The horizontal axis in the drawing represents a polar angle (°) with respect to the normal line of the display device, and corresponds to the first direction X in the X-Y plane, that is, a 0°-180° azimuth. The azimuth of 0° in the X-Y plane (a tip end of an arrow indicating the first direction X) is a positive angle, and the azimuth of 180° in the X-Y plane (a rear end of an arrow indicating the first direction X) is a negative angle. The vertical axis in the drawing represents luminance (relative value).

Conditions of the simulation described here are as follows. The illumination light from the illumination device IL is unpolarized light, the second viewing angle control panel 2 is sandwiched between the fourth polarizer POL4 and the fifth polarizer POL5, no other optical element is provided, a drive voltage of the second liquid crystal layer LC2 at the time of ON is 2.5 V, and the wavelength of the transmitted light is 550 nm.

"A" in the drawing corresponds to the viewing angle characteristic at the time of OFF. At the time of OFF, a substantially symmetric luminance distribution can be obtained even when the observation position is inclined to the left side of the drawing with respect to the normal direction and even when the observation position is inclined to the right side of the drawing with respect to the normal direction.

"B" in the drawing corresponds to the viewing angle characteristic at the time of ON. At the time of ON, when the observation position is inclined to the right side of the drawing with respect to the normal direction, luminance of about 20% or more is obtained over the range of 0° to +50°. On the other hand, when the observation position is inclined to the left side of the drawing with respect to the normal direction, the luminance is about 3% or less in the range of 30° or more (the range of −30° to −80° in the drawing), and the luminance is about 1% or less in the range of 40° or more (the range of −40° to −80° in the drawing), so that a substantially light-shielding state is obtained.

Next, viewing angle characteristics of the first viewing angle control panel 1 will be described.

Figure 12:
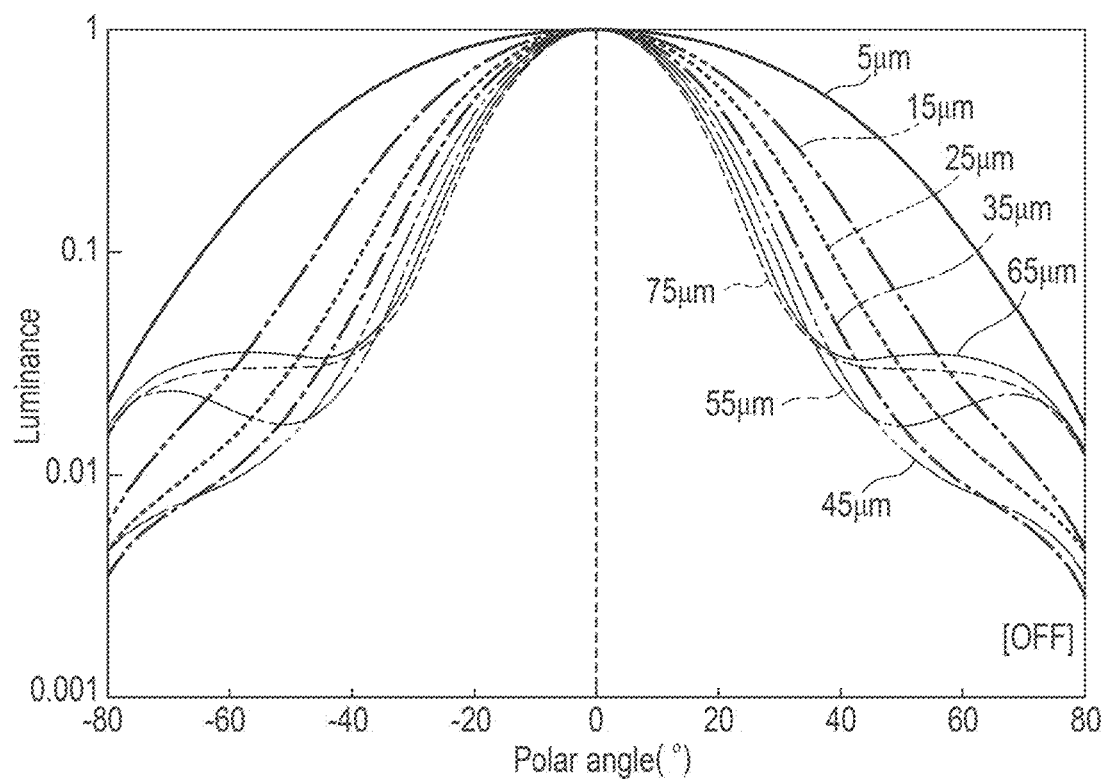
FIG. 12 is a diagram illustrating viewing angle characteristics of the first viewing angle control panel 1 at the time of OFF.

FIG. 12 is a diagram illustrating viewing angle characteristics of the first viewing angle control panel 1 at the time of OFF. The horizontal axis in the drawing represents the polar angle (°) with respect to the normal line of the display device, and the vertical axis in the drawing represents the luminance (relative value).

Conditions of the simulation described here are as follows. The illumination light from the illumination device IL is unpolarized light, the first viewing angle control panel 1 is sandwiched between the second polarizer POL2 and the third polarizer POL3, no other optical element is provided, and the wavelength of the transmitted light is 550 nm. Refractive anisotropy Δn in the first liquid crystal layer LC1 is set to 0.1482, and the first liquid crystal layer LC1 is formed of a negative liquid crystal material. The voltage applied to the first liquid crystal layer LC1 is 0 V (OFF).

The simulation of the luminance with respect to the polar angle was performed under the condition that the thickness d of the first liquid crystal layer LC1 was different. The thicknesses d were 5 μm, 15 μm, 25 μm, 35 μm, 45 μm, 55 μm, 65 μm, and 75 μm.

Under any condition of the thickness d, the maximum luminance is obtained when observed from the normal direction. In addition, under any condition of the thickness d, even when the observation position is inclined to the left side of the drawing with respect to the normal direction or even when the observation position is inclined to the right side of the drawing with respect to the normal direction, a substantially symmetric luminance distribution can be obtained. In particular, it was confirmed that the range of high luminance tended to decrease (alternatively, it is limited to a polar angle close to the normal) as the thickness d increased. However, when the thickness d exceeds 55 μm, the luminance does not sufficiently decrease in a range where the polar angle exceeds 40°. Therefore, in order to limit the viewing angle to a narrow range, there is a preferable condition of the thickness d, and in the above example, the thickness d is preferably around 45 μm.

Figure 13:
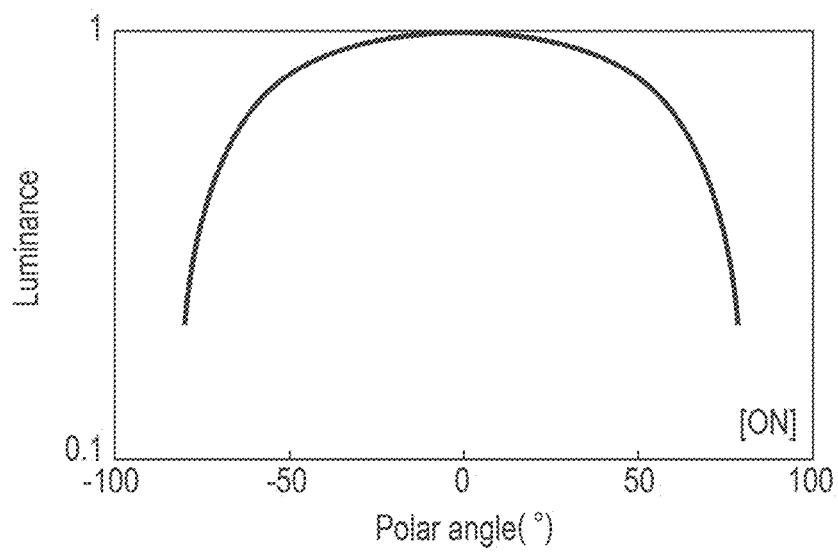

FIG. 13 is a diagram illustrating viewing angle characteristics of the first viewing angle control panel 1 at the time of ON. The horizontal axis in the drawing represents the polar angle (°) with respect to the normal line of the display device, and the vertical axis in the drawing represents the luminance (relative value).

The conditions of the simulation here are as follows. The voltage applied to the first liquid crystal layer LC1 is 30 V (ON).

At the time of ON, the same viewing angle characteristic can be obtained under any condition of the thickness d. Therefore, in FIG. 13, viewing angle characteristics of all thicknesses are illustrated in an overlapping manner. In addition, under any condition of the thickness d, even when the observation position is inclined to the left side of the drawing with respect to the normal direction or even when the observation position is inclined to the right side of the drawing with respect to the normal direction, a substantially symmetric luminance distribution can be obtained. The high luminance range at the time of ON is larger than the high luminance range at the time of OFF.

Second Configuration Example

Figure 14:
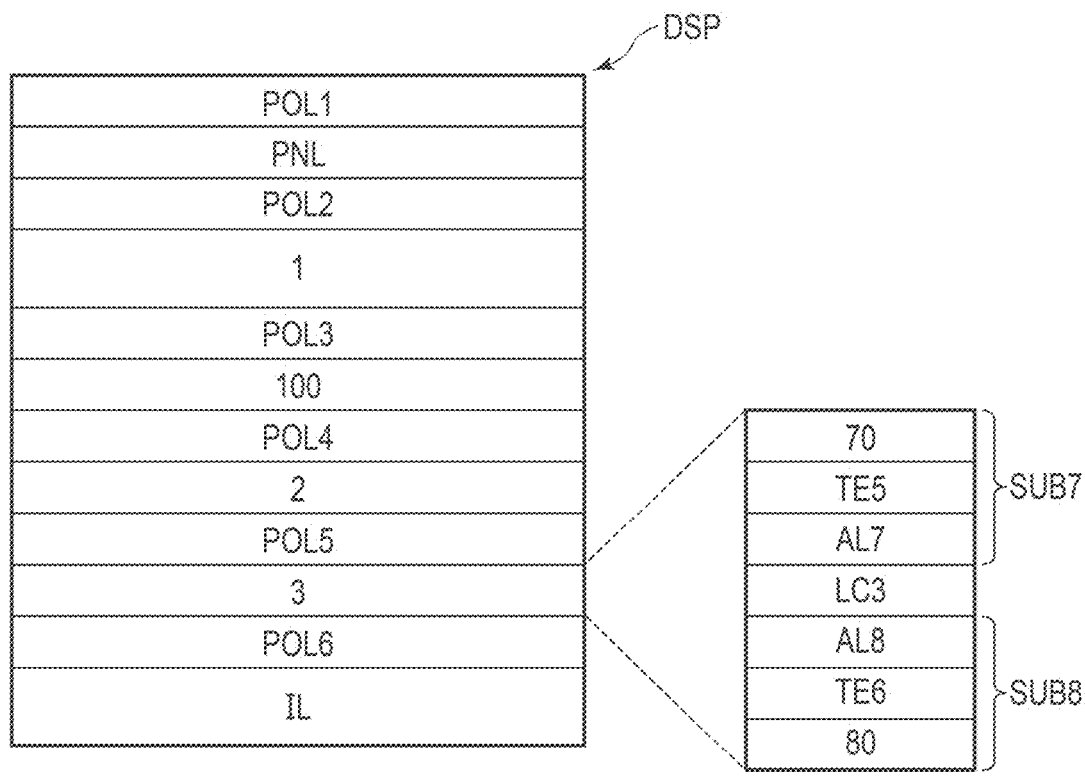
FIG. 14 is a diagram illustrating another configuration example of the display device DSP according to the embodiment.

FIG. 14 is a diagram illustrating another configuration example of the display device DSP of the present embodiment.

The second configuration example illustrated in FIG. 14 is different from the first configuration example illustrated in FIG. 1 in that the display device DSP further includes a third viewing angle control panel 3 and a sixth polarizer POL6.

The first viewing angle control panel 1 is provided between the display panel PNL and the polarization axis rotating element 100. The second viewing angle control panel 2 and the third viewing angle control panel 3 are provided between the polarization axis rotating element 100 and the illumination device IL. In the illustrated example, the third viewing angle control panel 3 is provided between the second viewing angle control panel 2 and the illumination device IL. The polarization axis rotating element 100 is provided between the first viewing angle control panel 1 and the second viewing angle control panel 2 or between the first viewing angle control panel 1 and the third viewing angle control panel 3.

The first polarizer POL1 is provided on the front surface side (alternatively, the observation position side on which the display device DSP is observed) of the display panel PNL. The second polarizer POL2 is provided between the display panel PNL and the first viewing angle control panel 1. A third polarizer POL3 is provided between the first viewing angle control panel 1 and the polarization axis rotating element 100. A fourth polarizer POL4 is provided between the polarization axis rotating element 100 and the second viewing angle control panel 2. The fifth polarizer POL5 is provided between the second viewing angle control panel 2 and the third viewing angle control panel 3. The sixth polarizer POL6 is provided on the back side (alternatively, between the third viewing angle control panel 3 and the illumination device IL) of the third viewing angle control panel 3.

The third viewing angle control panel 3 is a twisted nematic liquid crystal element similarly to the second viewing angle control panel 2 illustrated in FIG. 2. As simplified in FIG. 14, the third viewing angle control panel 3 includes a seventh substrate SUB7, an eighth substrate SUB8, and a third liquid crystal layer LC3.

The seventh substrate SUB7 is located on the front surface side of the eighth substrate SUB8. The seventh substrate SUB7 includes an insulating substrate 70, a fifth transparent electrode TE5, and an alignment film AL7. The fifth transparent electrode TE5 is provided between the insulating substrate 70 and the alignment film AL7.

The eighth substrate SUB8 includes an insulating substrate 80, a sixth transparent electrode TE6, and an alignment film AL8. The sixth transparent electrode TE6 is provided between the insulating substrate 80 and the alignment film AL8. The alignment film AL7 and the alignment film AL8 are in contact with the third liquid crystal layer LC3. The alignment film AL7 and the alignment film AL8 are horizontal alignment films.

The third liquid crystal layer LC3 is held between the seventh substrate SUB7 and the eighth substrate SUB8, and sealed by a sealant. As will be described later, the third liquid crystal layer LC3 contains twist-aligned liquid crystal molecules, and has optical rotary power to rotate the polarization axis of the polarization component that is linearly polarized light.

That is, the third viewing angle control panel 3 is a liquid crystal panel configured similarly to the second viewing angle control panel 2, but the alignment state of the liquid crystal molecules in the third liquid crystal layer LC3 is different from the alignment state of the liquid crystal molecules in the second liquid crystal layer LC2 as described later. Examples of the case in which the alignment states of the liquid crystal molecules are different include a case in which a plurality of liquid crystal molecules aligned in the third direction Z are twist-aligned in different rotation directions in planar view of the liquid crystal layer, a case in which the initial alignment azimuth of the liquid crystal molecules located in the vicinity of the substrate interface in the liquid crystal layer is different, a case in which the initial alignment azimuth of the liquid crystal molecules located in the intermediate layer in the liquid crystal layer is different, a case in which the pre-tilt angle of the liquid crystal molecules is different, and a case in which the twist angle of the liquid crystal molecules is different.

Figure 15:
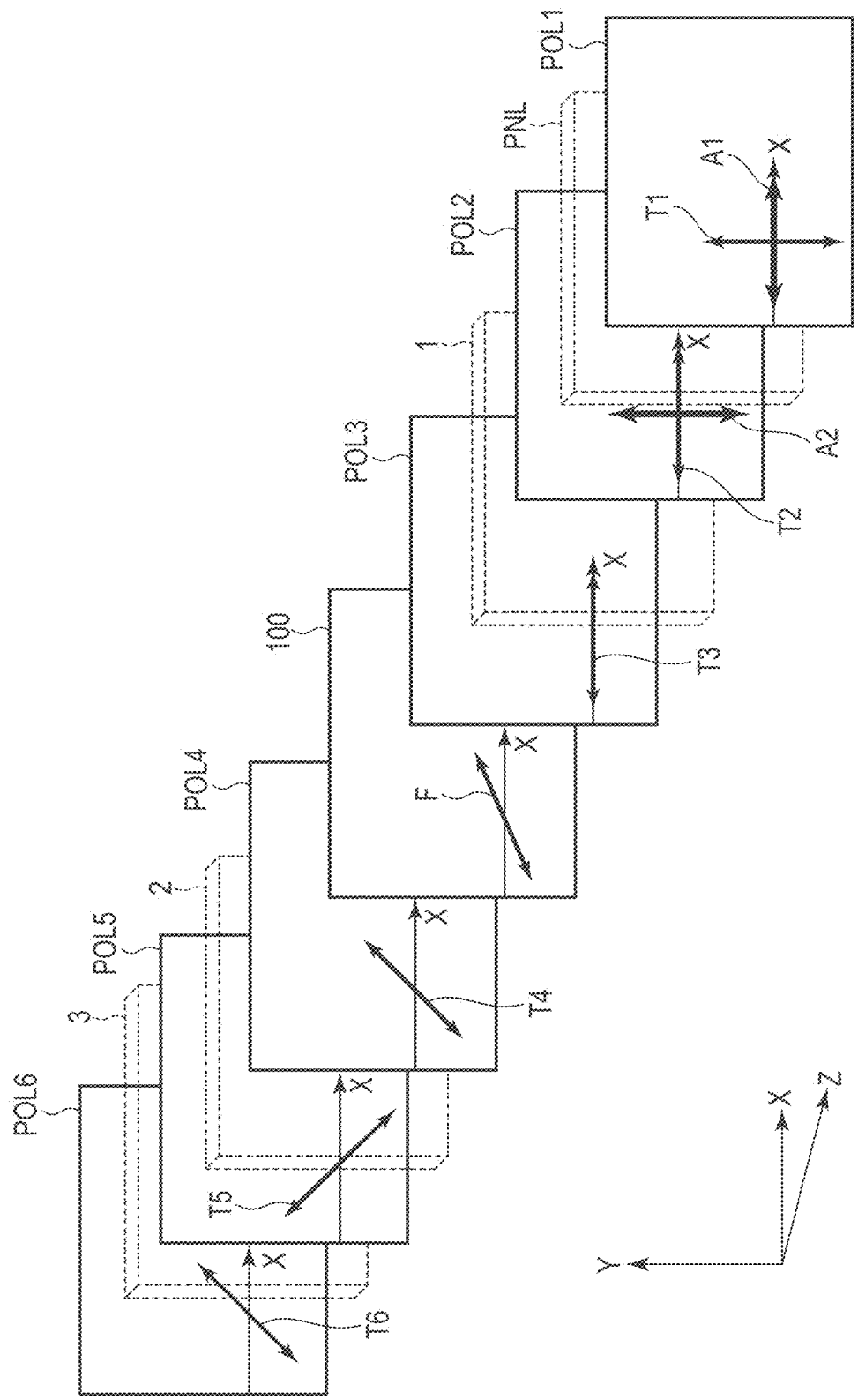
FIG. 15 is a diagram for explaining an axial angle of each optical element constituting the display device DSP illustrated in FIG. 14.

FIG. 15 is a diagram for explaining an axial angle of each optical element constituting the display device DSP illustrated in FIG. 14.

The transmission axis of each of the first polarizer POL1, the second polarizer POL2, the third polarizer POL3, the fourth polarizer POL4, and the fifth polarizer POL5 and the fast axis of the polarization axis rotating element 100 are similar to those in the example illustrated in FIG. 3.

The sixth polarizer POL6 has a sixth transmission axis T6.

The transmission axes of the fifth polarizer POL5 and the sixth polarizer POL6 sandwiching the third viewing angle control panel 3 are orthogonal to each other. That is, the fifth transmission axis T5 is located in an azimuth of 135°. The sixth transmission axis T6 is substantially orthogonal to the fifth transmission axis T5 and is located in an azimuth of 45°.

Next, the third viewing angle control panel 3 will be described.

Figure 16:
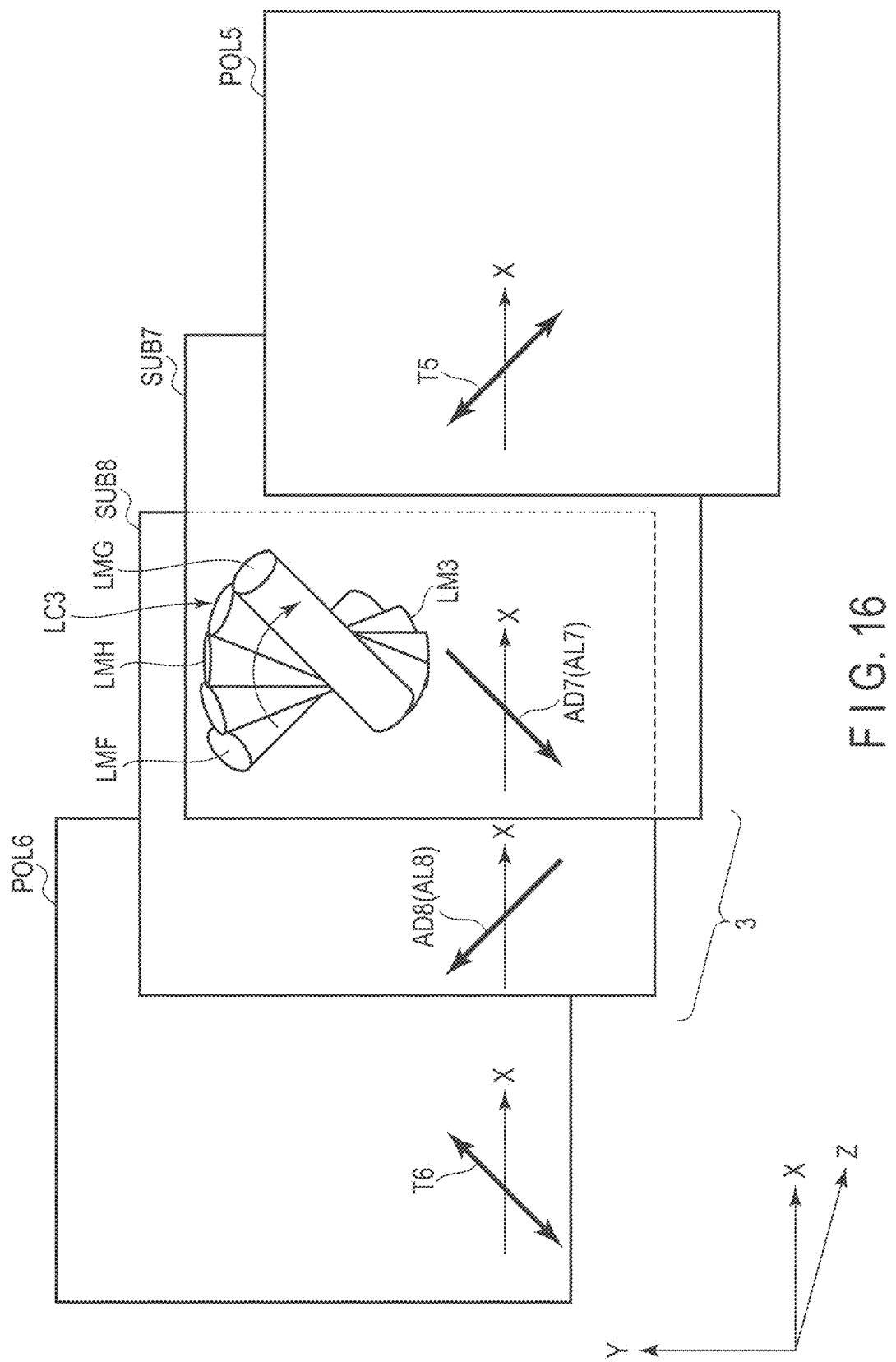
FIG. 16 is a diagram for explaining a configuration example of a third viewing angle control panel 3.

FIG. 16 is a diagram for explaining a configuration example of the third viewing angle control panel 3. Here, the initial alignment state of the liquid crystal molecules LM3 at the time of OFF when no voltage is applied to the third liquid crystal layer LC3 between the alignment film AL7 and the alignment film AL8 is shown.

An alignment treatment direction AD8 of the alignment film AL8 is substantially orthogonal to an alignment treatment direction AD7 of the alignment film AL7. In the configuration example shown in FIG. 16, the alignment treatment direction AD8 is substantially orthogonal to the sixth transmission axis T6, and the alignment treatment direction AD7 is substantially orthogonal to the fifth transmission axis T5. That is, the alignment treatment direction AD8 is located in an azimuth of 135°, and the alignment treatment direction AD7 is located in an azimuth of 225°.

In the third liquid crystal layer LC3, the liquid crystal molecules LM3 aligned along the third direction Z are twist-aligned. FIG. 16 schematically illustrates a plurality of liquid crystal molecules LM3 in planar view. A chiral agent is added to the third liquid crystal layer LC3, and the liquid crystal molecules LM3 are configured to be twist-aligned clockwise from the sixth polarizer POL6 (or eighth substrate SUB8) toward the fifth polarizer POL5 (or seventh substrate SUB7). That is, the liquid crystal molecules LM3 are twist-aligned in a direction different from the liquid crystal molecules LM2 of the second liquid crystal layer LC2. The liquid crystal molecules LM2 of the second liquid crystal layer LC2 and the liquid crystal molecules LM3 of the third liquid crystal layer LC3 may be twist-aligned in the same direction. That is, both the liquid crystal molecules LM2 and LM3 may be twist-aligned clockwise or may be twist-aligned counterclockwise.

A liquid crystal molecule LMF on a side close to the sixth polarizer POL6 and the eighth substrate SUB8 is aligned so that its major axis is along the alignment treatment direction AD8. Alternatively, the liquid crystal molecule LMF is aligned in an azimuth substantially orthogonal to the sixth transmission axis T6. That is, the liquid crystal molecule LMF is aligned in an azimuth of 135°. The alignment azimuth of the liquid crystal molecule LMF is substantially parallel to the alignment azimuth of the liquid crystal molecule LMC in the second liquid crystal layer LC2 shown in FIG. 6 in the X-Y plane. In addition, the liquid crystal molecule LMF is inclined so that the end portion on a tip end side of an arrow indicating the alignment treatment direction AD8 is separated from the eighth substrate SUB8.

A liquid crystal molecule LMG on a side close to the fifth polarizer POL5 and the seventh substrate SUB7 is aligned so that its major axis is along the alignment treatment direction AD7. Alternatively, the liquid crystal molecule LMG is aligned in an azimuth substantially orthogonal to the fifth transmission axis T5. That is, the liquid crystal molecule LMG is aligned in an azimuth of 225°. In addition, the liquid crystal molecule LMG is inclined so that the end portion on a tip end side of an arrow indicating the alignment treatment direction AD7 is separated from the seventh substrate SUB7 (alternatively, the end portion on the rear end side of the arrow indicating the alignment treatment direction AD7 is inclined so as to approach the seventh substrate SUB7).

A liquid crystal molecule (third liquid crystal molecule) LMH at substantially the center (intermediate layer) of the third liquid crystal layer LC3 in the third direction (thickness direction) Z is aligned so that its major axis is along the second direction Y. The major axis of the liquid crystal molecule LMH is substantially parallel to the first transmission axis T1 of the first polarizer POL1 shown in FIG. 14. That is, in the X-Y plane, the alignment azimuth of the liquid crystal molecule LME in the second liquid crystal layer LC2 is different from the alignment azimuth of the liquid crystal molecule LMF in the third liquid crystal layer LC3, and is, for example, orthogonal to each other.

At least one of the arrow indicating the alignment treatment direction AD7 and the arrow indicating the alignment treatment direction AD8 may be reversed. In addition, the alignment treatment direction AD8 may be located in an azimuth of 225°, and the alignment treatment direction AD7 may be located in an azimuth of 135°. When the liquid crystal molecule LMH is aligned along the second direction Y, the liquid crystal molecules LM3 aligned in the third direction Z may be twist-aligned counterclockwise.

Such a third viewing angle control panel 3 is rotationally symmetric by 90° in the X-Y plane with respect to the second viewing angle control panel 2. Therefore, the viewing angle characteristic of the third viewing angle control panel 3 is rotationally symmetric by 90° in the X-Y plane with respect to the viewing angle characteristic of the second viewing angle control panel 2. For example, at the time of ON when the voltage is applied to the third liquid crystal layer LC3, the luminance distribution is asymmetric between the case where the observation position is inclined to the upper side in the drawing (on a tip end side of the arrow indicating the second direction Y) with respect to the normal direction (third direction Z) of the display device and the case where the observation position is inclined to the lower side in the drawing (on a rear end side of the arrow indicating the second direction Y) with respect to the normal direction.

As described above, according to the present embodiment, by combining the first viewing angle control panel 1, the second viewing angle control panel 2, and the third viewing angle control panel 3, it is possible to control the viewing angle not only in the left-right direction but also in the up-down direction.

Second Configuration Example; Modified Example

In a modified example described below, the configuration of the third viewing angle control panel 3 of the display device DSP of the second configuration example described with reference to FIGS. 14 and 15 is different. Hereinafter, the third viewing angle control panel 3 in the modified example will be described.

Figure 17:
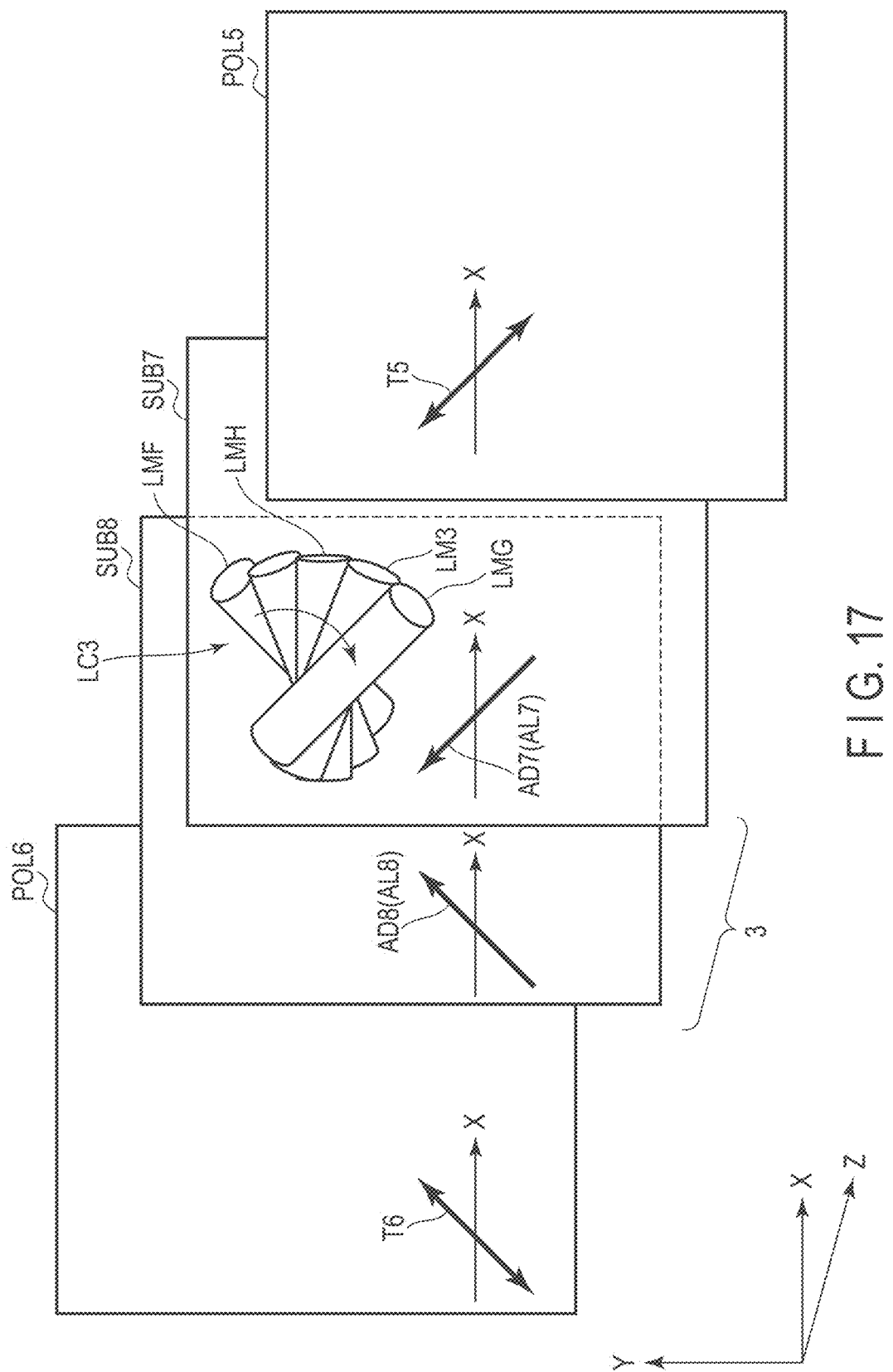
FIG. 17 is a diagram for explaining another example of the third viewing angle control panel 3.

FIG. 17 is a diagram for explaining another example of the third viewing angle control panel 3. Here, the initial alignment state of the liquid crystal molecules LM3 at the time of OFF when no voltage is applied to the third liquid crystal layer LC3 between the alignment film AL7 and the alignment film AL8 is shown.

An alignment treatment direction AD8 of the alignment film AL8 is substantially orthogonal to an alignment treatment direction AD7 of the alignment film AL7. In the configuration example shown in FIG. 17, the alignment treatment direction AD8 is substantially parallel to the sixth transmission axis T6, and the alignment treatment direction AD7 is substantially parallel to the fifth transmission axis T5. That is, the alignment treatment direction AD8 is located in an azimuth of 45°, and the alignment treatment direction AD7 is located in an azimuth of 135°.

In the third liquid crystal layer LC3, the liquid crystal molecules LM3 aligned along the third direction Z are twist-aligned. FIG. 17 schematically illustrates a plurality of liquid crystal molecules LM3 in planar view. A chiral agent is added to the third liquid crystal layer LC3, and the liquid crystal molecules LM3 are configured to be twist-aligned clockwise from the sixth polarizer POL6 (or eighth substrate SUB8) toward the fifth polarizer POL5 (or seventh substrate SUB7). That is, the alignment state of the third liquid crystal layer LC3 is different from the alignment state of the second liquid crystal layer LC2, and the liquid crystal molecules LM3 of the third liquid crystal layer LC3 are twist-aligned in a direction different from the liquid crystal molecules LM2 of the second liquid crystal layer LC2.

A liquid crystal molecule LMF on a side close to the sixth polarizer POL6 and the eighth substrate SUB8 is aligned so that its major axis is along the alignment treatment direction AD8. Alternatively, the liquid crystal molecule LMF is aligned in an azimuth substantially parallel to the sixth transmission axis T6. That is, the liquid crystal molecule LMF is aligned in an azimuth of 45°. The alignment azimuth of the liquid crystal molecule LMF is substantially orthogonal to the alignment azimuth of the liquid crystal molecule LMC in the second liquid crystal layer LC2 shown in FIG. 6 in the X-Y plane. In addition, the liquid crystal molecule LMF is inclined so that the end portion on a tip end side of an arrow indicating the alignment treatment direction AD8 is separated from the eighth substrate SUB8.

A liquid crystal molecule LMG on a side close to the fifth polarizer POL5 and the seventh substrate SUB7 is aligned so that its major axis is along the alignment treatment direction AD7. Alternatively, the liquid crystal molecule LMG is aligned in an azimuth substantially parallel to the fifth transmission axis T5. That is, the liquid crystal molecule LMG is aligned in an azimuth of 135°. The alignment azimuth of the liquid crystal molecule LMG is substantially orthogonal to the alignment azimuth of the liquid crystal molecule LMD in the second liquid crystal layer LC2 shown in FIG. 6 in the X-Y plane. In addition, the liquid crystal molecule LMG is inclined so that the end portion on a tip end side of an arrow indicating the alignment treatment direction AD7 is separated from the seventh substrate SUB7 (alternatively, the end portion on the rear end side of the arrow indicating the alignment treatment direction AD7 is inclined so as to approach the seventh substrate SUB7).

A liquid crystal molecule (third liquid crystal molecule) LMH at substantially the center (intermediate layer) of the third liquid crystal layer LC3 in the third direction (thickness direction) Z is aligned so that its major axis is along the first direction X. The major axis of the liquid crystal molecule LMH is substantially orthogonal to the first transmission axis T1 of the first polarizer POL1 shown in FIG. 14. That is, in the X-Y plane, the alignment azimuth of the liquid crystal molecule LME in the second liquid crystal layer LC2 is substantially parallel to the alignment azimuth of the liquid crystal molecule LMF in the third liquid crystal layer LC3.

At least one of the arrow indicating the alignment treatment direction AD7 and the arrow indicating the alignment treatment direction AD8 may be reversed. In addition, the alignment treatment direction AD8 may be located in an azimuth of 135°, and the alignment treatment direction AD7 may be located in an azimuth of 45°. When the liquid crystal molecule LMH is aligned along the first direction X, the liquid crystal molecules LM3 aligned in the third direction Z may be twist-aligned counterclockwise.

Third Configuration Example

Figure 18:
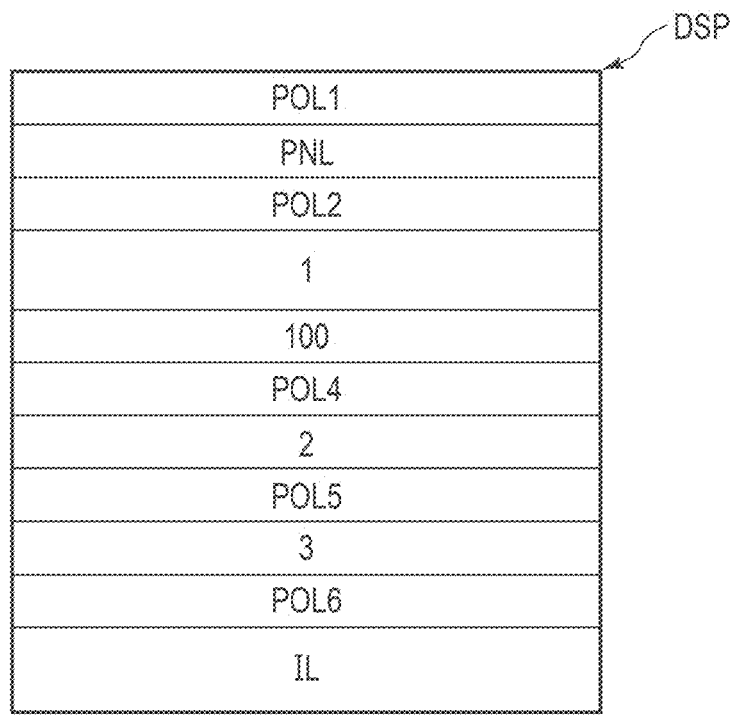
FIG. 18 is a diagram illustrating another configuration example of the display device DSP according to the embodiment.

FIG. 18 is a diagram illustrating another configuration example of the display device DSP of the present embodiment.

The third configuration example illustrated in FIG. 18 is different from the second configuration example illustrated in FIG. 14 in that the third polarizer POL3 is omitted. That is, the first viewing angle control panel 1 faces the polarization axis rotating element 100. For example, the polarization axis rotating element 100 is bonded to the insulating substrate 40 constituting the first viewing angle control panel 1.

When the light transmitted through the polarization axis rotating element 100 is linearly polarized light having a polarization degree similar to that of the second polarization component incident on the first viewing angle control panel 1, the third polarizer POL3 can be omitted.

Therefore, in addition to the effects described above, the number of components constituting the display device DSP is reduced, and the cost can be reduced.

Comparative Example

Figure 19:
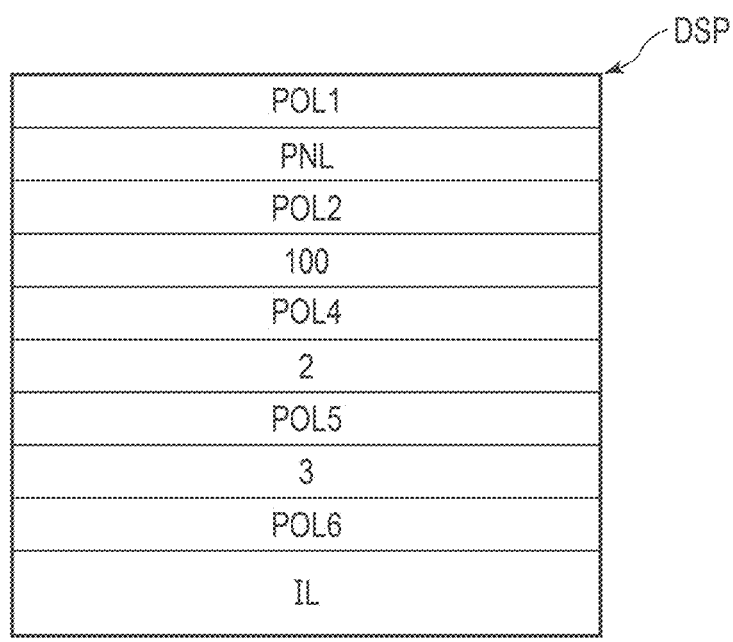
FIG. 19 is a diagram illustrating a comparative example of the display device DSP.

FIG. 19 is a diagram illustrating a comparative example of the display device DSP.

The comparative example illustrated in FIG. 19 is different from the third configuration example illustrated in FIG. 18 in that the first viewing angle control panel 1 is omitted.

Viewing Angle Characteristics of Display Device DSP

Next, viewing angle characteristics of the display device DSP will be described.

Figure 20:
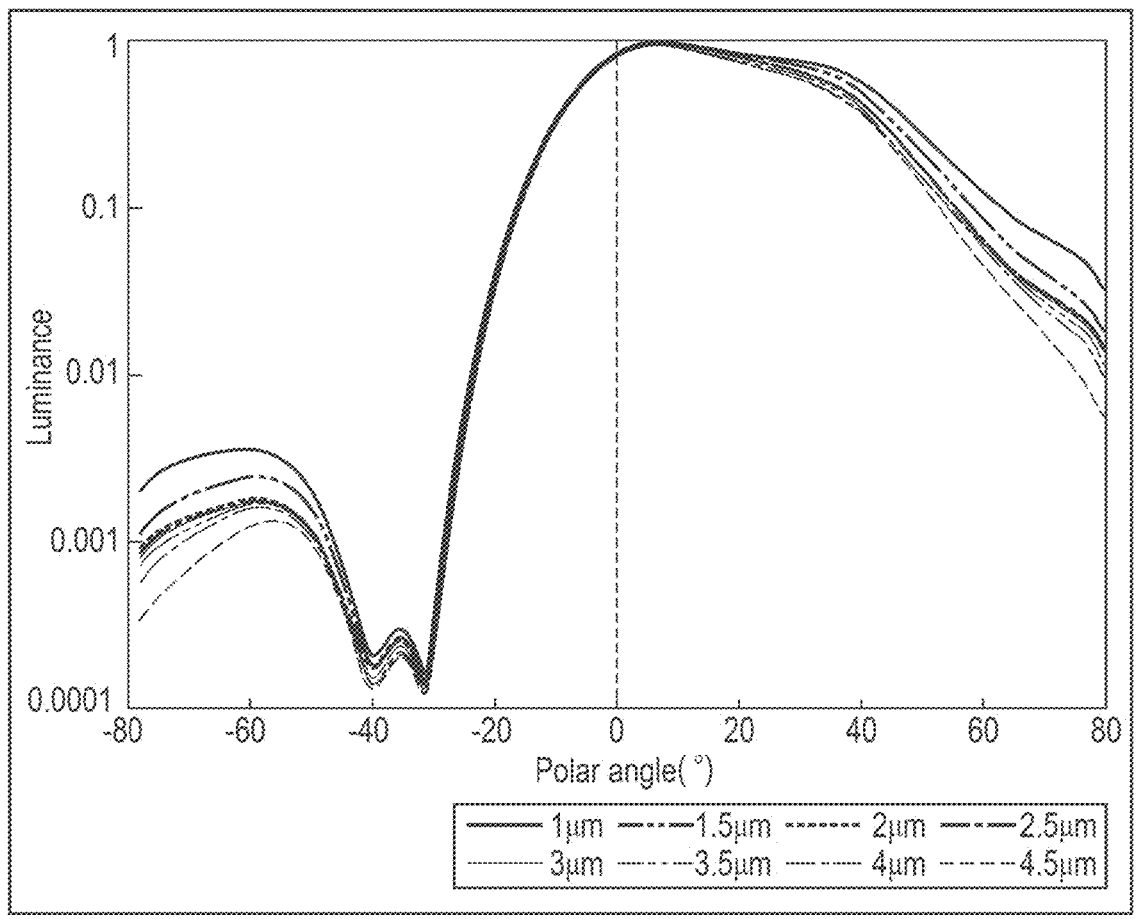
FIG. 20 is a diagram illustrating viewing angle characteristics of the display device DSP.

FIG. 20 is a diagram illustrating viewing angle characteristics of the display device DSP. The horizontal axis in the drawing represents the polar angle (°) with respect to the normal line of the display device DSP, and the vertical axis in the drawing represents the luminance (relative value).

Conditions of the simulation described here are as follows. The configuration of the display device DSP assumed here is as described in the modified example of the second configuration example, the display panel PNL is sandwiched between the first polarizer POL1 and the second polarizer POL2, the first viewing angle control panel 1 is sandwiched between the second polarizer POL2 and the third polarizer POL3, the second viewing angle control panel 2 is sandwiched between the fourth polarizer POL4 and the fifth polarizer POL5, the third viewing angle control panel 3 is sandwiched between the fifth polarizer POL5 and the sixth polarizer POL6, and the polarization axis rotating element 100 is sandwiched between the third polarizer POL3 and the fourth polarizer POL4. The configuration of the second viewing angle control panel 2 is as described with reference to FIG. 6, and the configuration of the third viewing angle control panel 3 is as described with reference to FIG. 17.

The illumination light from the illumination device IL is unpolarized light, and the wavelength of the transmitted light is 550 nm. Refractive anisotropy Δn in the first liquid crystal layer LC1 is set to 0.1482, and the first liquid crystal layer LC1 is formed of a negative liquid crystal material. The voltage applied to the first liquid crystal layer LC1 is 0 V (OFF), and the drive voltage of the second liquid crystal layer LC2 is 2.5 V (ON).

The simulation of the luminance with respect to the polar angle was performed under the condition that the thickness d of the first liquid crystal layer LC1 was different. The thicknesses d were 1 μm, 1.5 μm, 2 μm, 2.5 μm, 3 μm, 3.5 μm, 4 μm, and 4.5 μm.

Under any condition of the thickness d, the maximum luminance is obtained when observed from the vicinity of the normal direction. In addition, under any condition of the thickness d, due to the influence of the viewing angle characteristics of the second viewing angle control panel 2 and the third viewing angle control panel 3, asymmetric luminance distribution can be obtained between the case where the observation position is inclined to the right side of the drawing with respect to the normal direction and the case where the observation position is inclined to the left side of the drawing with respect to the normal direction. In the illustrated example, the luminance obtained when the observation position is inclined to the right side of the drawing with respect to the normal direction is higher than the luminance obtained when the observation position is inclined to the left side of the drawing with respect to the normal direction.

Figure 21:
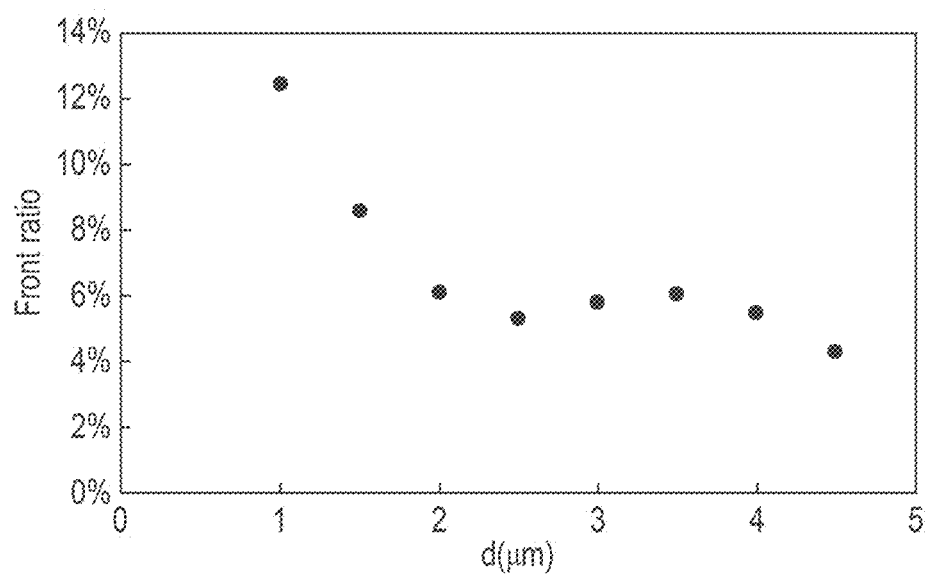
FIG. 21 is a diagram illustrating a front ratio based on a simulation result illustrated in FIG. 20.

FIG. 21 is a diagram illustrating a front ratio based on the simulation result illustrated in FIG. 20. The horizontal axis in the drawing represents the thickness d of the first liquid crystal layer LC1, and the vertical axis in the drawing represents the front ratio. Here, the front ratio is defined as a ratio of luminance at a polar angle of 60° to luminance at a polar angle of 0°.

From this result, it has been confirmed that when the thickness d is 1 μm or more, the front ratio in the direction of the polar angle of 60° is 12.5% or less.

As described above, according to the present embodiment, the viewing angle of the display device DSP can be controlled by combining at least the first viewing angle control panel 1 and the second viewing angle control panel 2.

Comparison of Viewing Angle Characteristics

Next, each of the above-described configuration examples and comparative examples will be described while comparing viewing angle characteristics of the respective display devices DSP.

Figure 22:
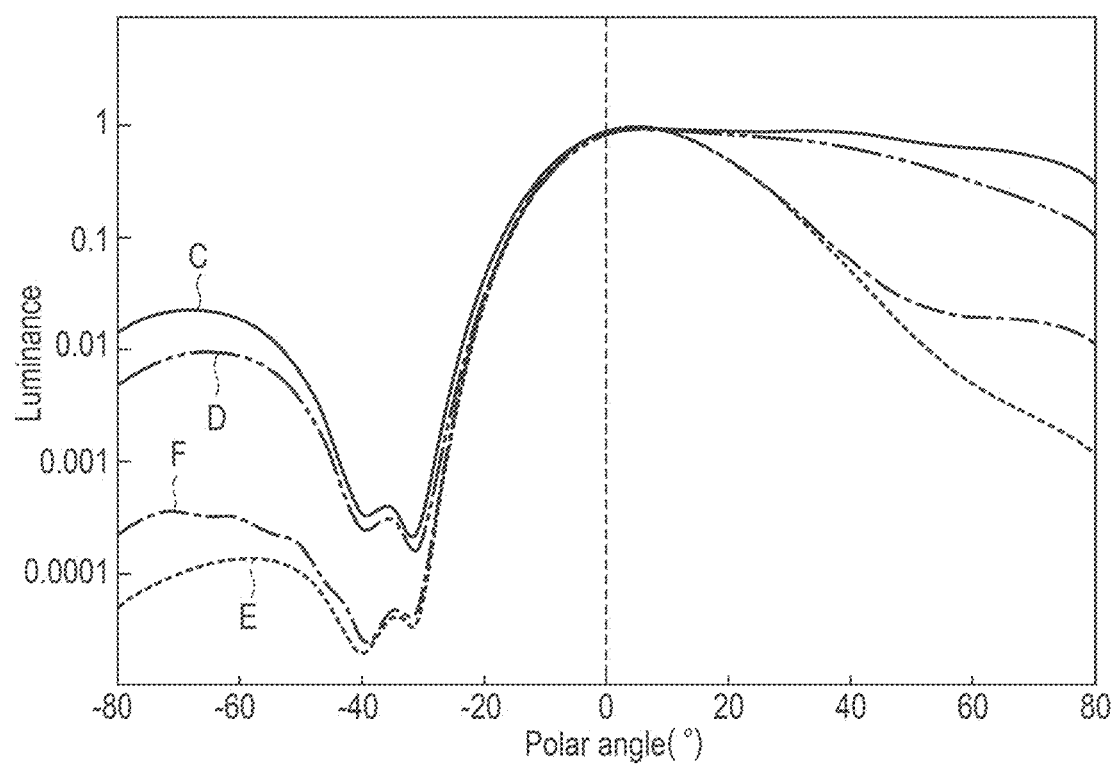
FIG. 22 is a diagram illustrating viewing angle characteristics of the display device DSP.

FIG. 22 is a diagram illustrating viewing angle characteristics of the display devices DSP. The horizontal axis in the drawing represents the polar angle (°) with respect to the normal line of the display device DSP, and the vertical axis in the drawing represents the luminance (relative value).

"C" in the drawing indicates the viewing angle characteristic of the display device DSP in the comparative example, "D" in the drawing indicates the viewing angle characteristic of the display device DSP in the first configuration example (the thickness d of the first liquid crystal layer LC1 is 1.5 μm), "E" in the drawing indicates the viewing angle characteristic of the display device DSP in the second configuration example, and "F" in the drawing indicates the viewing angle characteristic of the display device DSP in the third configuration example.

In any example, it was confirmed that when the maximum luminance was 1, the luminance was less than 10% in the range where the polar angle was −20° or less (range of −20° to −80° in the drawing), and the light shielding state was almost established.

In addition, it was confirmed that the viewing angle characteristics in the first configuration example, the second configuration example, and the third configuration example can reduce the luminance in both the case where the observation position is inclined to the right side of the drawing with respect to the normal direction and the case where the observation position is inclined to the left side of the drawing with respect to the normal direction, as compared with the viewing angle characteristics of the comparative example.

In particular, according to the second configuration example and the third configuration example, it was confirmed that when the maximum luminance was 1, the luminance can be reduced to less than 10% in the range of the polar angle of 40° or more.

Application Example

Figure 23:
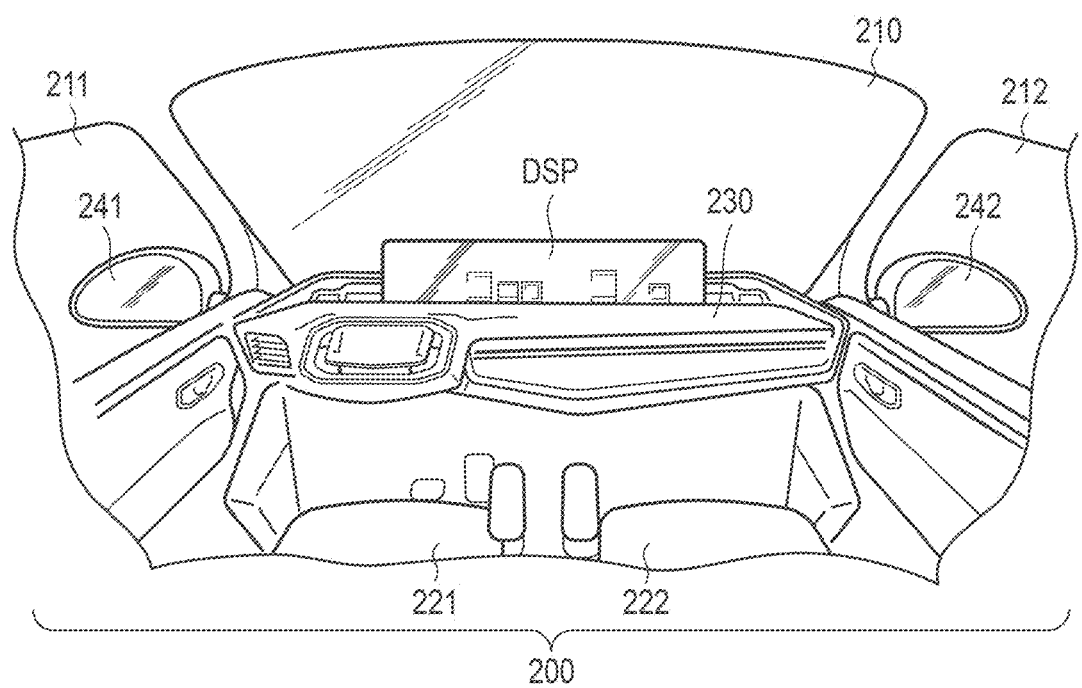
FIG. 23 is a diagram illustrating an application example of the display device DSP.

FIG. 23 is a diagram illustrating an application example of the display device DSP. The display device DSP illustrated in FIG. 23 corresponds to a vehicle display device mounted on a vehicle 200. The vehicle 200 includes a windshield 210 provided at the front of the vehicle, side windows 211 and 212 provided on the sides of the vehicle 200, a driver seat 221 and a passenger seat 222, a dashboard 230 provided in front of the driver seat 221 and the passenger seat 222, a display device DSP provided on the dashboard 230, and side mirrors 241 and 242 provided on the sides of the vehicle 200, respectively.

The display device DSP is located in front of the driver seat 221 and the passenger seat 222. It is assumed that the driver seat 221 and the passenger seat 222 are arranged in the first direction X described in each of the above configuration examples.

When the illustrated display device DSP is configured by applying each of the above configuration examples, the azimuth on the tip end side of the arrow indicating the first direction X illustrated in FIG. 3 and the like corresponds to the azimuth on the passenger seat side, and the azimuth on the rear end side of the arrow indicating the first direction X corresponds to the azimuth on the driver seat side. Among the polar angles illustrated in FIG. 22 and the like, the range of the positive polar angle corresponds to the polar angle when the display device DSP is observed from the passenger seat side, and the range of the negative polar angle corresponds to the polar angle when the display device DSP is observed from the driver seat side.

The driver in the driver seat 221 now observes the display device DSP from substantially the front or obliquely left. In addition, the passenger on the passenger seat 222 observes the display device DSP from substantially the front or obliquely right.

Here, when the first viewing angle control panel 1 is set to the OFF state and the second viewing angle control panel 2 is set to the ON state, the viewing angle characteristic as illustrated in FIG. 22 is obtained. Therefore, when the driver in the driver seat 221 tries to observe the display device DSP in the range of the polar angle of 20° or more (the range of −20° to −80°), the light shielding state is substantially generated. Therefore, the driver cannot visually recognize the image displayed on the display device DSP. In a mode in which the second viewing angle control panel 2 is set to the OFF state, the driver can visually recognize the image displayed on the display device DSP.

On the other hand, when the passenger on the passenger seat 222 tries to observe the display device DSP in the front or in the range of the polar angle of 30° or less (the range of 0° to 30°), the passenger can visually recognize the image displayed on the display device DSP.

In the range of the polar angle of 40° or more (range of 40° to 80°), the luminance is reduced to less than 10% as described above. Therefore, an undesirable phenomenon (reflection) in which the displayed image is projected on a side window 212 is suppressed. As a result, it is possible to suppress a decrease in visibility when the driver visually recognizes a side mirror 242 through the side window 212.

In the above application example, an example in which the display device DSP is mounted on a vehicle has been described, but it is not limited thereto. For example, the display device DSP according to the present embodiment can be applied to electronic devices such as portable electronic devices and various monitors.

As described above, according to the present embodiment, it is possible to provide a display device capable of controlling the viewing angle.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A display device comprising:
a display panel configured to modulate a first polarization component;
a first viewing angle control panel including a first liquid crystal layer containing hybrid-aligned liquid crystal molecules;
a second viewing angle control panel including a second liquid crystal layer containing twist-aligned liquid crystal molecules; and
a polarization axis rotating element provided between the first viewing angle control panel and the second viewing angle control panel, wherein
the first viewing angle control panel is provided between the polarization axis rotating element and the display panel,
in planar view, an initial alignment direction of a horizontally aligned first liquid crystal molecule among liquid crystal molecules of the first liquid crystal layer is substantially orthogonal to an initial alignment direction of a second liquid crystal molecule located in an intermediate layer among liquid crystal molecules of the second liquid crystal layer,
a second polarization axis of a second polarization component transmitted through the first viewing angle control panel is substantially parallel to a first polarization axis of the first polarization component,
a third polarization axis of a third polarization component transmitted through the second viewing angle control panel is different from the second polarization axis, and
the polarization axis rotating element is configured to rotate the third polarization axis to align the third polarization axis with the second polarization axis.

2. The display device according to claim 1, wherein the polarization axis rotating element is configured to apply a phase difference of ½ wavelength to the third polarization component.

3. The display device according to claim 2, further comprising:
a first polarizer provided on a front surface side of the display panel;
a second polarizer provided between the display panel and the first viewing angle control panel;
a third polarizer provided between the first viewing angle control panel and the polarization axis rotating element;
a fourth polarizer provided between the polarization axis rotating element and the second viewing angle control panel; and a fifth polarizer provided on a back surface side of the second viewing angle control panel, wherein the third polarizer has a third transmission axis through which the second polarization component is transmitted, the fourth polarizer has a fourth transmission axis through which the third polarization component is transmitted, and a fast axis or a slow axis of the polarization axis rotating element is located in an intermediate azimuth between an azimuth of the third transmission axis and an azimuth of the fourth transmission axis in planar view.

4. The display device according to claim 3, wherein
the first polarizer has a first absorption axis, and
the initial alignment direction of the second liquid crystal molecule is substantially parallel to the first absorption axis in planar view.

5. The display device according to claim 3, further comprising
a third viewing angle control panel including a third liquid crystal layer containing twist-aligned liquid crystal molecules, wherein
an alignment state of the third liquid crystal layer is different from an alignment state of the second liquid crystal layer, and
an initial alignment direction of a third liquid crystal molecule located in an intermediate layer among the liquid crystal molecules of the third liquid crystal layer is substantially orthogonal to the initial alignment direction of the second liquid crystal molecule in planar view.

6. The display device according to claim 5, further comprising
a sixth polarizer provided on a back surface side of the third viewing angle control panel, wherein
the liquid crystal molecules of the second liquid crystal layer are twist-aligned from the fifth polarizer toward the fourth polarizer, and
the liquid crystal molecules of the third liquid crystal layer are twist-aligned from the sixth polarizer toward the fifth polarizer.

7. The display device according to claim 6, wherein in planar view, an initial alignment direction of a liquid crystal molecule close to the fifth polarizer among the liquid crystal molecules of the second liquid crystal layer is substantially parallel to an initial alignment direction of a liquid crystal molecule close to the sixth polarizer among the liquid crystal molecules of the third liquid crystal layer.

8. The display device according to claim 7, wherein
in the second liquid crystal layer, the liquid crystal molecule close to the fifth polarizer is aligned in an azimuth of 135° counterclockwise with respect to a reference azimuth, and a liquid crystal molecule close to the fourth polarizer is aligned in an azimuth of 45° counterclockwise with respect to the reference azimuth, and
in the third liquid crystal layer, the liquid crystal molecule close to the sixth polarizer is aligned in an azimuth of 135° counterclockwise with respect to the reference azimuth, and a liquid crystal molecule close to the fifth polarizer is aligned in an azimuth of 225° counterclockwise with respect to the reference azimuth.

9. The display device according to claim 3, further comprising
a third viewing angle control panel including a third liquid crystal layer containing twist-aligned liquid crystal molecules, wherein
an alignment state of the third liquid crystal layer is different from an alignment state of the second liquid crystal layer, and
an initial alignment direction of a third liquid crystal molecule located in an intermediate layer among the liquid crystal molecules of the third liquid crystal layer is substantially parallel to the initial alignment direction of the second liquid crystal molecule in planar view.

10. The display device according to claim 9, further comprising
a sixth polarizer provided on a back surface side of the third viewing angle control panel, wherein
in planar view, an initial alignment direction of a liquid crystal molecule close to the fifth polarizer among the liquid crystal molecules of the second liquid crystal layer is substantially orthogonal to an initial alignment direction of a liquid crystal molecule close to the sixth polarizer among the liquid crystal molecules of the third liquid crystal layer.

11. The display device according to claim 10, wherein
in the second liquid crystal layer, the liquid crystal molecule close to the fifth polarizer is aligned in an azimuth of 135° counterclockwise with respect to a reference azimuth, and a liquid crystal molecule close to the fourth polarizer is aligned in an azimuth of 45° counterclockwise with respect to the reference azimuth, and
in the third liquid crystal layer, the liquid crystal molecule close to the sixth polarizer is aligned in an azimuth of 45° counterclockwise with respect to the reference azimuth, and a liquid crystal molecule close to the fifth polarizer is aligned in an azimuth of 135° counterclockwise with respect to the reference azimuth.

* * * * *